US011693643B2

(12) United States Patent
Wilson et al.

(10) Patent No.: US 11,693,643 B2
(45) Date of Patent: Jul. 4, 2023

(54) NETWORK-BASED SOLUTION MODULE DEPLOYMENT PLATFORM

(71) Applicant: Accenture Global Solutions Limited, Dublin (IE)

(72) Inventors: Lisa Suzanne Wilson, Chicago, IL (US); Hossam Elhoseiny Elsherif, West Windsor, NJ (US); Tegbir Singh Harika, Plano, TX (US); Anurag Goel, Mississauga (CA); Arjyo Ajoy Banerjee, Manchester (GB); Radhai Sivaraman, Fremont, CA (US); Rahul Jaiswal, Dublin (IE); Dhiren Desai, Woodstock, MD (US)

(73) Assignee: Accenture Global Solutions Limited, Dublin (IE)

( * ) Notice: Subject to any disclaimer, the term of this patent is extended or adjusted under 35 U.S.C. 154(b) by 20 days.

(21) Appl. No.: 17/395,414

(22) Filed: Aug. 5, 2021

(65) Prior Publication Data

US 2023/0038226 A1    Feb. 9, 2023

(51) Int. Cl.
*G06F 8/60*    (2018.01)
*G06F 11/30*    (2006.01)
(Continued)

(52) U.S. Cl.
CPC .............. *G06F 8/60* (2013.01); *G06F 11/302* (2013.01); *G06F 11/3476* (2013.01); *H04L 63/102* (2013.01); *H04L 67/34* (2013.01)

(58) Field of Classification Search
CPC ......... G06F 8/60; G06F 11/3476; H04L 67/34
(Continued)

(56) References Cited

U.S. PATENT DOCUMENTS 7,779,055 B2 * 8/2010 Peng ................... G06F 8/658
707/819
9,792,100 B1 * 10/2017 Mahapatra .............. H04W 4/02
(Continued)

OTHER PUBLICATIONS

Girod, Lewis, et al. "Emstar: A software environment for developing and deploying heterogeneous sensor-actuator networks." ACM Transactions on Sensor Networks (TOSN) 3.3 (2007): pp. 2-35. (Year: 2007).*
(Continued)

*Primary Examiner* — Satish Rampuria
(74) *Attorney, Agent, or Firm* — Norton Rose Fulbright US LLP

(57) ABSTRACT

The present invention provides a deployment platform that enables solution modules to be created and deployed without writing new code. The solution modules may include existing solutions, solution components, connectors, and the like selected from a solution library. The deployment platform includes a development engine providing functionality for generating deployment information for the solution module. The deployment information may include a blueprint or other information for deploying the solution module to target infrastructure. The deployment platform also includes a deployment engine providing functionality for deploying the solution module to the target infrastructure automatically. During deployment, the deployment engine pushes components of the solution module to the target infrastructure in accordance with the deployment information. During and after deployment, information may be captured and recorded to a distributed ledger to provide end-to-end visibility into the deployed solution over the deployment lifecycle (e.g., including initial deployment, updates/upgrades, and decommissioning).

17 Claims, 7 Drawing Sheets

(51) Int. Cl.
*H04L 67/00* (2022.01)
*H04L 9/40* (2022.01)
*G06F 11/34* (2006.01)

(58) Field of Classification Search
USPC .................................................. 717/168–178
See application file for complete search history.

(56) References Cited

U.S. PATENT DOCUMENTS

| | | | |
|---|---|---|---|
| 10,154,091 B1* | 12/2018 | Flaherty | H04L 67/1097 |
| 2002/0129129 A1* | 9/2002 | Bloch | H04L 9/40 709/218 |
| 2013/0117749 A1* | 5/2013 | Mechelke | G06F 8/63 718/102 |
| 2017/0228227 A1 | 8/2017 | Winterfeldt et al. | |
| 2018/0329693 A1 | 11/2018 | Eksten et al. | |
| 2020/0272556 A1* | 8/2020 | Podjarny | G06F 16/245 |
| 2020/0301689 A1* | 9/2020 | Mechler | G06F 8/63 |
| 2020/0387357 A1* | 12/2020 | Mathon | G06F 9/4411 |

OTHER PUBLICATIONS

Han, Chih-Chieh, et al. "A dynamic operating system for sensor nodes." Proceedings of the 3rd international conference on Mobile systems, applications, and services. 2005.pp. 163-176 (Year: 2005).*
Brown, Stephen, and C. J. Sreenan. "Updating software in wireless sensor networks: A survey." Dept. of Computer Science, National Univ, of Ireland, Maynooth, Tech. Rep (2006): 1-14. (Year: 2006).*
Brunette, Wayion, et al. "Open Data Kit 2.0: A services-based application framework for disconnected data management." Proceedings of the 15th Annual International Conference on Mobile Systems, Applications, and Services. 2017.pp. 440-452 (Year: 2017).*
Adkins, Joshua, et al. "The signpost platform for city-scale sensing." 2018 17th ACM/IEEE International Conference on Information Processing in Sensor Networks (IPSN). IEEE, 2018.pp. 1-14 (Year: 2018).*
European Patent Office, Communication, Extended Search Report issued for European Patent Application No. 22186847.4, dated Jan. 9, 2023, 10 pages.

* cited by examiner

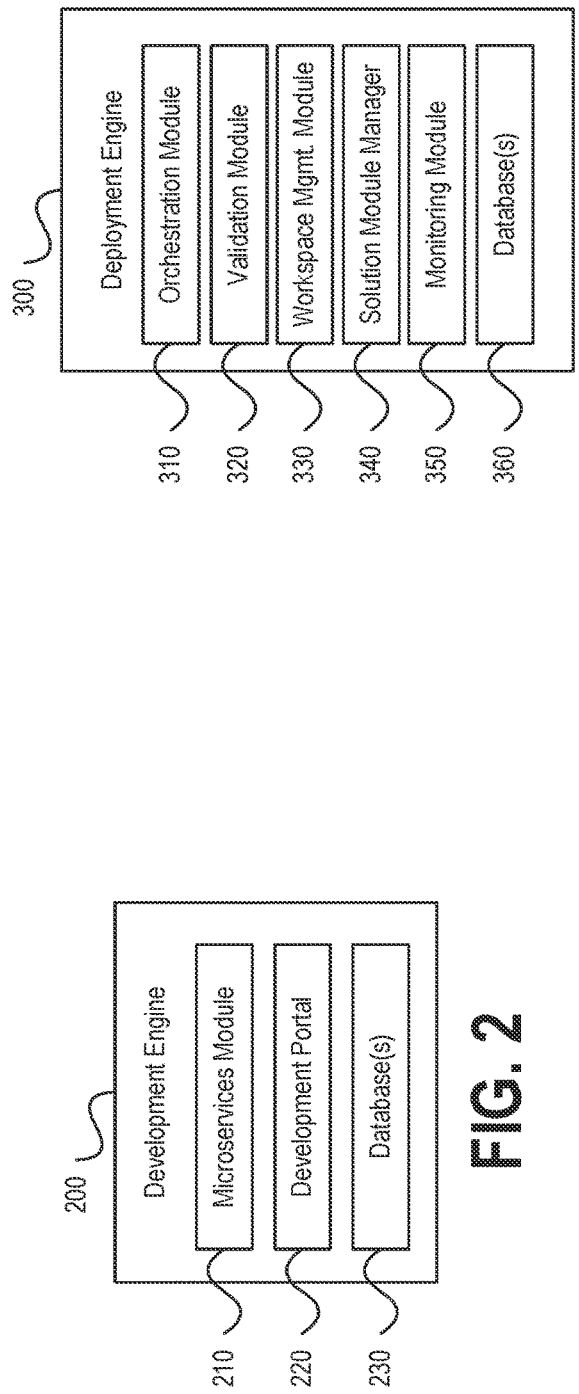
FIG. 3
FIG. 2
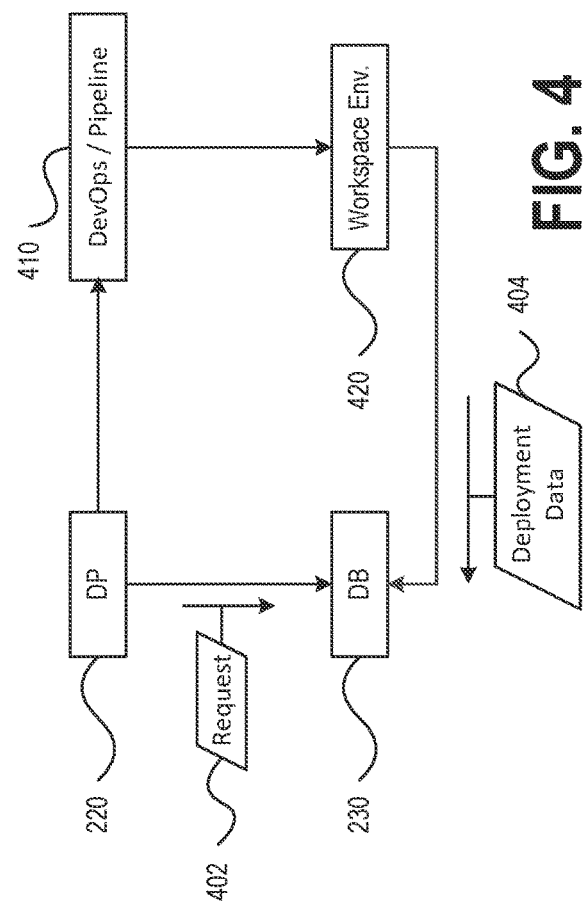
FIG. 4

NETWORK-BASED SOLUTION MODULE DEPLOYMENT PLATFORM

TECHNICAL FIELD

The present invention relates generally to software distribution systems and more specifically to a systems architecture and platform for intelligent configuration, distribution, and tracking of network-based services.

BACKGROUND OF THE INVENTION

Advances in computing hardware capabilities have resulted in computing devices that are far more powerful than those available just a decade or two ago. In tandem with the improvements to computing hardware, network capabilities and accessibility of network-based services has significantly expanded. These advances have resulted in increasing complexities with respect to development and deployment of software and services, especially software and services requiring interoperability and/or communication with different systems and/or between different networks.

Entities developing industry-based solutions often spend significant amounts of time developing the software to support services or other functionality that may be provided to users irrespective of the type of device a user has (e.g., a mobile computing device or smartphone, a tablet computing device, a personal computing device, a laptop computing device, a smartwatch, and the like) and irrespective of the type of network access (e.g., wireless fidelity (WiFi) network cellular network, etc.) the user's device utilizes to access those services or functionality. While the actual development of the software and systems to support services is a time consuming process, tools have been developed to aid in the design and development process, such as software development kits (SDKs), automated programming tools driven by artificial intelligence to generate program code or testing scripts, and the like. Such tools may enable the software to be developed more quickly, but there are still several challenges that industry-based solution developers face with respect to developing, deploying, and maintaining software-based solutions at scale. In particular, challenges still remain with respect to developing and deploying software, services, or other types of functionality in a manner that is predictable, repeatable, and reusable.

To illustrate, developers often work in teams that operate independent of one another to develop solutions for particular aspects of an industry (e.g., cloud systems or services, Web 3.0 development, client applications, server applications, and the like). Since these independent teams operate in silos (e.g., different locations, different departments or divisions, different clients, etc.) they may each be unaware of the fact that a solution to a problem (or a component of the solution) they are attempting to solve has already been developed or solved by another team, resulting in development of a redundant solution (or components) that needlessly delays the development life cycle. Additionally, when redundant or different solutions (or components) to an industry problem are created, it may be that one solution is more efficient than the other or has additional capabilities, resulting in deployment of a solution that is less efficient than another available solution.

Deployment of multiple solutions to a single problem across systems of different industry participants needlessly creates additional overhead in terms of support or maintenance, and can lead to increased downtime for the systems where the solutions are deployed. Moreover, deployment of these different solutions may become more complex due to the need to integrate different or independently developed solutions across different client systems (e.g., different cloud providers, different system hardware configurations, and the like). Such challenges are typically resolved via manual installation or deployment of the solution(s) with further development and configuration of the solution as needed during the deployment. It can be appreciated that tracking the different solutions that have been deployed is also a complex and typically time consuming process and it may be difficult to detect when updates or upgrades to the existing deployments are available and implement those updates or upgrades.

BRIEF SUMMARY OF THE INVENTION

The present invention provides a deployment platform providing functionality that overcomes many of the challenges that are present in existing deployment technologies. For example, deployment platforms in accordance with the present disclosure provide enhanced code reuse during development of solution modules and enable deployments of solution modules to be performed with improved predictability and reliability. With respect to reusability, the disclosed deployment platforms include a development engine that enables solution modules to be developed in a manner that does not requiring writing new code. During solution module development, the development engine may present a solution library to a user (e.g., a developer). The solution library may stores code associated with existing solutions, solution components, connectors, and the like, and the user may select different ones of the existing solutions, solution components, connectors, etc. from the solution library for inclusion in a solution module being developed. The particular existing solutions, solution components, connectors, etc. selected for inclusion in the solution module may be determined based on requirements information received from a customer.

The development engine may also be configured to instantiate a development workspace onto which the solution module may be deployed (e.g., for development purposes). The development workspace may be instantiated on the target infrastructure requested by the customer or a virtual environment. Utilizing the development workspace, the development engine may capture deployment information for deploying the solution module to the target infrastructure. For example, the deployment information may include a blueprint of the steps for deploying the solution module to the target infrastructure, dependency information (e.g., a particular portion of the solution module that should be deployed prior to another portion of the solution module, etc.), infrastructure requirements (e.g., information regarding services or other parameters of the target infrastructure that should be present for the deployed solution module), or other types of information that may place constraints on the manner in which the deployment is executed.

The deployment platform also includes a deployment engine providing functionality for deploying the solution module to the target infrastructure. The deployment engine may be configured to initiate the deployment in response to a triggering event, such as detection that the solution module is in a deployment ready state (e.g., development is complete and the development information has been finalized). During deployment, the deployment engine may utilize the deployment information to push the solution module to the target infrastructure. During the deployment, the deployment engine may validate various types of information, such as validating access credentials prior to initiating the deployment, verifying that any infrastructure requirements are satisfied, and the like. Additionally, the deployment engine may be configured to push the components of the solution module to the target infrastructure based on the dependency information generated for the solution module. For example, the dependency information may specify that a particular portion of the solution module (e.g., a particular solution, solution component, connector, etc.) be deployed prior to another portion of the solution module, and the deployment engine may use the dependency information to push the different portions of the solution module to the target infrastructure according to a sequence that is consistent with the dependency information.

The platform may also be configured to capture information regarding the status of the solution module as it progresses through its lifecycle and record the captured information to a database, which in some aspects may be a distributed ledger. For example, the distributed ledger may capture information indicating that the solution deployment was initiated (e.g., the various portions of the solution module are being pushed to the target infrastructure), information indicating that the solution deployment is complete (e.g., the solution module was successfully deployed to the target infrastructure), or other types of information. As these various pieces of information are captured along the solution lifecycle, the captured information may be recorded (e.g., as new records, populating one or more data fields of existing records, etc.) to the distributed ledger. By capturing and recording information associated with deployment of a solution module in this manner, the distributed ledger may capture information regarding the solution module over the entire lifecycle, which may include a period of time during which the initial deployment is completed, one or more updates/upgrades are deployed for the solution module, and the solution module is decommissioned (e.g., the solution module is removed from the target infrastructure). These various pieces of information may be presented to a user, such as the developer, via a graphical user interface to provide an end-to-end view (e.g., from a time when the solution module is requested or ordered to decommissioning of the solution module and everything in between) with respect to each solution module deployed by the deployment platform.

In addition to providing functionality for executing the deployment and capturing information in connection with the deployment, deployment platforms in accordance with the present disclosure may provide functionality for transmitting notifications to users, such as the developer, the customer, or both. For example, when the deployment is initiated, a notification may be transmitted to the user(s) to indicate that the deployment has been initiated. If desired, notifications may also be transmitted to the user(s) as the deployment progresses (e.g., notifications indicating that a particular component of the solution module was successfully pushed to the target infrastructure, notifications that one or more validations were successful, etc.) and upon completion of the deployment. In addition to deployment-specific notifications, the disclosed development platforms may also be configured to provide notifications when updates or upgrades to a deployed solution module become available. For example, a notification may be transmitted to the user(s) when a deployed solution module is updated (e.g., when one of the solutions, solution components, connectors, or other components of the solution module is updated). If the customer desires to use the updated solution module, the above-described process may be utilized to push the updated solution module (or merely the components that have changed due to the update) to the target infrastructure.

Deploying solution modules using the disclosed deployment platforms may enable solution modules to be developed more rapidly by leveraging code reuse (e.g., building the solution module from existing solutions, solution components, connectors, and the like). This reduces the amount of time that is spent creating the functionality requested by a customer and may allow the developer's focus to be on post-deployment customization (e.g., integration of the deployed solution module with the customer's backend databases or other systems) and optimization. Additionally, because the solution library provides visibility into all existing solutions, solution components, connectors, etc., development of redundant solution functionality may be eliminated, regardless of whether solution developers operate in silos or not. Moreover, the functionality provided by the disclosed deployment platforms enable deployments to be performed in a predictable manner (e.g., via using the development deployment workspace, etc. to generate deployment information that may be used to manage deployment to the target infrastructure), which may increase the likelihood that the deployment is successful. The automated deployment capabilities of the deployment platforms also enable solution modules to be reliably deployed any number of times for any number of customers. Furthermore, the tracking and notification capabilities enable the lifecycle of deployed solution modules to be tracked individually and provide a user (e.g., the developer or the customer) with an end-to-end view of the lifecycle, as well as information about available changes to the deployed solution module (e.g., notifications regarding the availability of upgrades or updates for the deployed solution module).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 is a block diagram illustrating exemplary aspects of a development engine in accordance with the present disclosure;

FIG. 3 is a block diagram illustrating exemplary aspects of a deployment engine in accordance with the present disclosure;

FIG. 4 is a block diagram illustrating exemplary aspects of a development process in accordance with the present disclosure;

Figure 1:
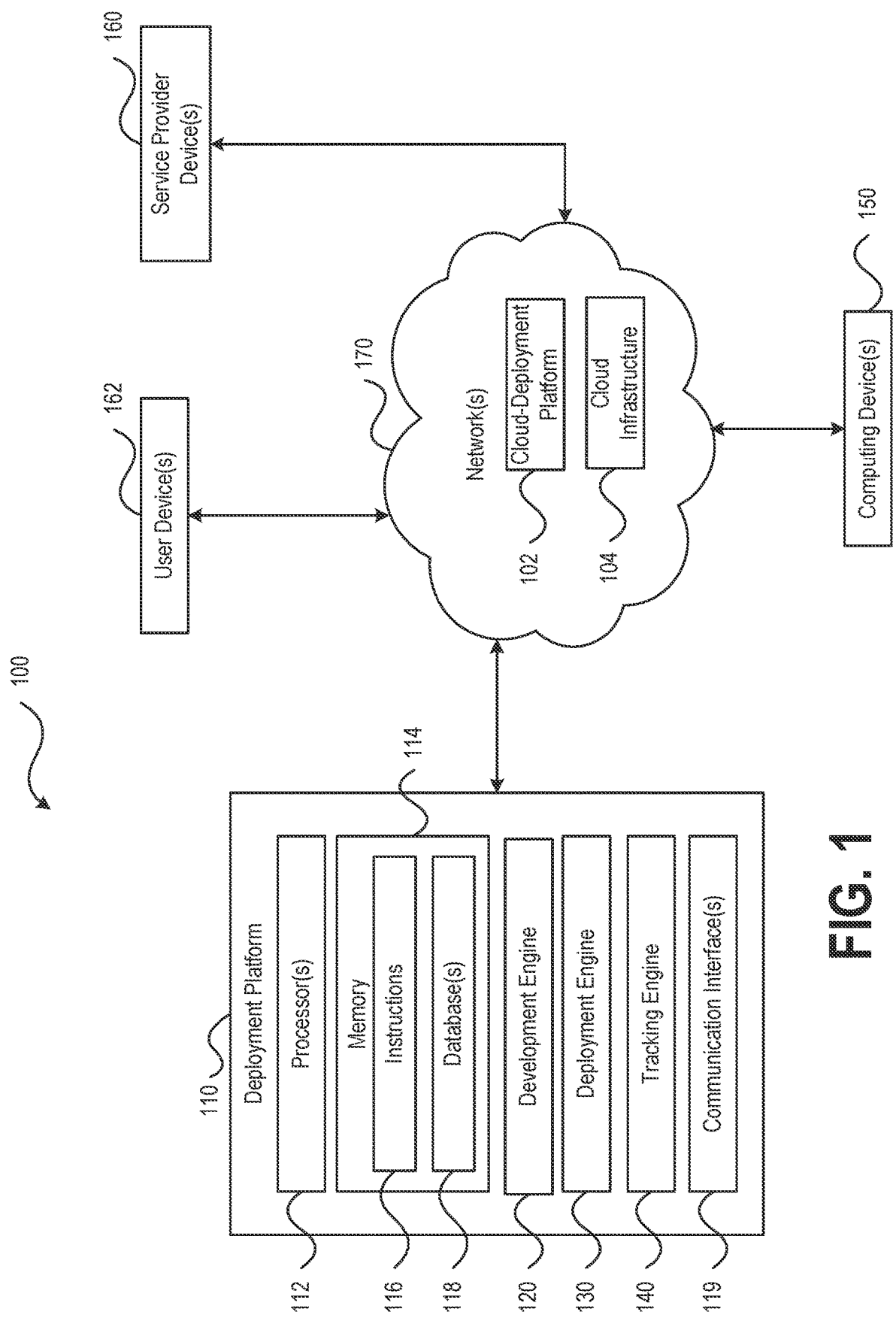
FIG. 1 is a block diagram of a network-based solution deployment system in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

The present invention provides a deployment platform that leverages automation and code reuse capabilities to develop and deploy solution modules that may be deployed to target infrastructure in a manner that does not requiring writing new code. The disclosed deployment platforms may include or have access to a solution library that stores code associated with existing solutions, solution components, connectors, and the like. A development engine may be provided to allow a user (e.g., a developer) to select different ones of the existing solutions, solution components, connectors, etc. from the solution library for inclusion in a solution module. The particular existing solutions, solution components, connectors, etc. selected for inclusion in the solution module may be determined based on requirements information received from a customer. During development of the solution module, a development workspace may be instantiated that is the same as or similar to a target infrastructure onto which the solution module is to be deployed. The development workspace may be used to capture deployment information for deploying the solution module to the target infrastructure. For example, the deployment information may include a blueprint of the steps for deploying the solution module to the target infrastructure, dependency information (e.g., a particular portion of the solution module should be deployed prior to another portion of the solution module, etc.), infrastructure requirements (e.g., information regarding services or other parameters of the target infrastructure that should be present for the deployed solution module), or other types of information.

The deployment platform may also include a deployment engine providing functionality for deploying the solution module to the target infrastructure in an automated fashion. The deployment engine may be configured to initiate the deployment in response to a triggering event, such as detection that the solution module is in a deployment ready state. During deployment, the deployment engine may utilize the deployment information to deploy the solution module to target infrastructure. During the deployment, the deployment engine may validate various types of information (e.g., access credentials for the deployment, infrastructure requirements, etc.) and may push the components of the solution module to the target infrastructure while taking into account any dependency information associated with the solution module. During deployment, the deployment engine may capture information regarding the status of the deployment (e.g., deployment initiated, in-progress, complete, etc.) and record the captured information to a distributed ledger. The captured information may provide end-to-end visibility into the deployed solution module over the deployment lifecycle (e.g., including initial deployment, updates/upgrades, and decommissioning).

Deploying solution modules in accordance with the concepts disclosed herein enables the solution modules to be developed and deployed more rapidly through efficient techniques that promote reusability, predictability, and reliability. For example, by leveraging existing solutions, solution components, connectors, and the like to build the solution module, time spent developing the functionality requested by a customer may be reduced and occurrences of development of redundant solution functionality may be eliminated, regardless of whether solution developers operate in silos or not. Moreover, utilizing a development workspace to create a blueprint and other deployment information for the solution module prior to deploying the solution module to the target infrastructure may improve the likelihood that the deployment is successful. Additionally, once in a state that is suitable for deployment, the solution modules generated in accordance with the present disclosure may be reliably deployed any number of times. Exemplary details of the above-described operations and functionality provided by deployment platforms of the present disclosure are described in more detail below with reference to FIGS. 1-9.

Referring to FIG. 1, a block diagram of a network-based solution deployment system in accordance with aspects of the present disclosure is shown as a system 100. The system 100 provides functionality that enables development, configuration, and deployment of services and solutions to external systems in a rapid manner. Moreover, the system 100 enables existing solutions, services, or solution and service components to be reused and combined, thereby reducing development time and enabling new solutions to be created more quickly (e.g., due to the ability to reuse solution and/or service components to create new solutions or services). In addition to reducing complexities associated with new solution or service development, the system 100 also provides functionality that enables deployment of a solution or service to be performed in repeatable and automated manner. It is noted that the functionality for deploying solutions or services provided by the system 100 also includes functionality for modifying deployed solutions, such as to effectuate modifications to deployed services or solutions (e.g., upgrades, updates, or changes to deployed services, etc.) and to decommission deployed services. The system 100 also provides functionality for tracking a state of available services and solutions. For example, the system 100 may provide monitoring functionality to detect services or solutions that are ready for deployment (i.e., identify developed solutions or services that are in a state suitable for deployment to third party systems), a state of any deployments performed by the system 100 (e.g., determine when a deployment is initiated, in progress, completed, etc.), and may provide alerts and notifications to appropriate entities in connection with any deployments of solutions or services. Additional aspects and features of the system 100 are described in more detail below.

As shown in FIG. 1, the system 100 includes a deployment platform 110 that includes one or more processors 112, a memory 114, one or more communication interfaces 119, a development engine 120, a deployment engine 130, and a tracking engine 140. The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the deployment platform 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the deployment platform 110 may be stored in the memory 114 as instructions 116 that, when executed by the one or more processors 112, cause the one or more processors 112 to perform the operations described herein with respect to the deployment platform 110. Additionally, the memory 114 may be configured to store data and information at one or more databases 118. Illustrative aspects of the one or more databases 118 are described in more detail below.

The one or more communication interfaces 119 may include communication interfaces configured to communicatively couple the deployment platform 110 to other systems and devices via one or more networks 170. For example, the communication interface(s) 119 may communicatively couple the deployment platform to one or more computing devices 150, service provider device(s) 160, cloud-based systems or infrastructure (e.g., cloud infrastructure 104), or other types of devices, systems, or computing resources. It is noted that the one or more communication interfaces 119 may be configured to facilitate communicative coupling of the deployment platform 110 to the other systems and devices using wired or wireless communication links established using one or more communication protocols (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ Generation (3G) communication standard, a $4^{th}$ Generation (4G)/long term evolution (LTE) communication standard, a $5^{th}$ Generation (5G) communication standard, and the like). Moreover, it is to be understood that while FIG. 1 illustrates the deployment platform 110 in a server-type configuration, the functionality described with respect to the deployment platform 110 may be provided using a plurality of servers in a centralized or distributed arrangement or may be provided in a cloud-based configuration, shown in FIG. 1 as cloud-deployment platform 102.

It is noted that deployment platform 110 may be implemented as one or more physical servers or may be implemented as a cloud-based platform, shown in FIG. 1 as cloud-deployment platform 102. When implemented as a cloud-based platform, the functionality of the deployment platform 110 may be provided by computing resources (e.g., processors, memory, software, etc.) disposed within a cloud computing environment. Moreover, it is noted that while FIG. 1 illustrates the one or more databases 118 as being stored at the memory 114 of the deployment platform 110, it is to be understood that the one or more databases 118 may include centralized databases, decentralized databases, distributed ledgers, or a combination thereof. Moreover, in some implementations data redundancy may be utilized to replicate information stored at one database to another database locations (e.g., for load balancing purposes, to provide resiliency in the event of a failure of a database location, or for other purposes).

The development engine 120 may be configured to provide functionality that enables developers to view existing solutions, solution components, connectors, pipelines, and the like. The existing solutions, solution components, connectors, pipelines, etc. may include software associated with one or more services, service components, or other software that has been created by software developers associated with the deployment platform 110. For example, the one or more databases 118 may include a solution library corresponding to existing solutions that were previously developed by the software developers associated with the deployment platform 110. It is noted that the solution library may be stored in a distributed database, with different portions of the database being located at different geographic locations, such as different locations where the software developers that created the existing solutions are located. Despite being stored in a distributed database, a developer (e.g., a user that creates solutions to be deployed in response to customer requests) may be provided with visibility into all existing solutions, solution components, connectors, etc. stored in the solution library, thereby overcoming existing challenges associated with lack of an ability to reuse solutions developed by development teams operating in a geographically distributed development environment or in an otherwise independent manner. To facilitate the expanded visibility into the available existing solutions, the development engine 120 may be configured to provide a graphical user interface (GUI) that enables a developer to review the solution library based on requirements specified by a customer (e.g., information regarding the services or needs of a customer for which a solution is to be developed and/or deployed) and identify any existing solutions based on the customer requirements. Any existing solutions identified by the developer(s) as satisfying at least a portion of the customer requirements may then be used to build a solution module for the customer.

The solution module may include one or more existing solutions that satisfy the customer requirements and are suitable for deployment on target infrastructure specified by the customer. For example, the solution module may be configured to utilize one or more existing solutions, solution components, connectors (e.g., tools or code that enable communication between a solution/solution component and an external system, or other solutions and solution components, etc.), pipelines (e.g., data flows between and among the solutions/components, continuous integration/continuous deployment (CI/CD) pipelines for controlling aspects of the deployment to the target infrastructure, etc.), and the like. It is noted that the developer(s) may build the solution module (e.g., a solution for the customer) based entirely on solutions existing within the solution library such that no new solutions, services, or solution/service components need to be created, thereby reducing development time. In some instances, a solution module suitable for the customer requirements may require a combination of resources, including resources obtained from the solution library and newly developed solutions, services, or solution/service components. Moreover, it should be understood that where no existing solutions, services, or solution/service components meeting the customer requirements are available, the entire solution module may need to be developed from scratch. In such instances, the newly developed solution, once complete, may be added to the solution library so that it may be reused in the future.

The development engine 120 may also provide development operations functionality and pipeline building functionality. The development operations functionality may enable the developer to create a solution module for the customer that incorporates existing solutions or components selected from the solution library. The pipeline building functionality may enable the developer to define pipelines for controlling data or processing flows of the solution module (e.g., how the existing solutions or components of the solution module interact with each other to exchange information or provide services and functionality) in a manner that satisfies the customer requirements. The pipeline building functionality may also enable the developer to create CI/CD pipelines that may be used to control aspects of the deployment process or other aspects of the development of the solution module. In some aspects, once the solution module is configured (e.g., the existing solutions, solution components, pipelines, etc. are selected), a bill of materials (BOM) for the solution module may be generated. The BOM may include information that specifies the selections from the solution library that were included in the solution module (e.g., the solutions, solution components, connectors, pipelines, etc.) or other types of information (e.g., price information associated with deploying the solution module for a customer). The BOM may be stored in the one or more databases 118. Additional exemplary aspects of the operations performed by the development engine 120 are described and illustrated in more detail below with reference to FIGS. 2 and 4.

The deployment engine 130 may provide functionality for automating deployment of solution modules created via the development engine 120. For example, the deployment engine 130 may provide an orchestration service that may be utilized to control various tasks associated with deploying a solution module on the target infrastructure, which may include physical servers or other computing devices and resources of the customer and/or a third party (e.g., a cloud service provider (CSP)). During deployment of the solution module, the orchestration service may coordinate various operations that facilitate deployment or installation of the solution module on the target infrastructure or environment. Exemplary operations that may be coordinated by the orchestration service may include: verification of credentials in connection with the deployment, validation of workspace environment requirements (e.g., verify the presence of extended services of the target infrastructure utilized by the solution module, etc.), generation of one or more workspace management files that may be used to control and monitor the deployment, execution of a solution module blueprint for deploying the solution module, recording of data associated with the deployment at the one or more databases 118, or other types of operations. It is noted that while the orchestration service may be used to coordinate the above-described operations, the deployment engine 130 may include additional modules and functionality to actually perform those operations at the direction of, or in response to information provided by the orchestration service. Exemplary operations to deploy a solution module on target infrastructure using the deployment engine 130 are described in more detail below with reference to FIGS. 3, 5, and 6.

In some aspects, functionality of the deployment engine 130 may also be utilized to support operations of the development engine 120. For example, functionality of the deployment engine 130 may be utilized to instantiate a workspace environment in which the solution module may be configured for deployment. For example, the customer requirements may be related to deployment of a new cloud service for the customer and the customer requirements may specify a particular CSP (e.g., Amazon Web Services (AWS) provided by Amazon.com, Inc., Azure provided by Microsoft Corp., or another CSP). The development engine 120 leverages functionality of the deployment engine 130 to instantiate a development workspace environment compatible with the customer requirements and/or target infrastructure (e.g., the particular CSP specified in the customer requirements, etc.) for purposes of configuring the solution module prior to deployment. It is noted that the development workspace environment may be instantiated in an actual working environment, such as on a computing device configured similarly to infrastructure of the customer or a CSP infrastructure (e.g., creating a workspace environment on AWS), or may be instantiated in a virtual environment (e.g., a virtual workspace environment configured based on CSP infrastructure or customer infrastructure).

Information may be captured during configuration of the solution module on the development workspace environment (e.g., information regarding the type of environment or infrastructure the solution module can be deployed on) and used to generate one or more files specifying steps used for the deployment, configuration of variables or parameters used for the deployment, dependencies associated with the deployment (e.g., information specifying a particular solution or component of the solution module that should be deployed before another solution or component, etc.), information specifying infrastructure requirements that should be validated prior to deploying particular portions of the solution module (e.g., any services or functionality provided by the target infrastructure that are used by the solution module and need to be present within the target infrastructure), or other types of information that may be used to configure deployment of the solution module on the target infrastructure specified by the customer requirement.

In some aspects, a recording tool may be utilized to automatically capture the above-described information associated with configuring the deployment using the development workspace environment. For example, the recording tool may record the steps utilized to configure and deploy the solution module onto the workspace environment. In an additional or alternative aspect, the deployment configuration information (e.g., steps to successfully deploy the solution module to the workspace environment) may be created manually by a developer. The above-described information associated with configuring the deployment of a solution module onto the workspace environment may be stored as a blueprint in the one or more databases 118. As described in more detail below, the blueprint may be subsequently used at the time of deployment, such as to automate all or a portion of the deployment. Additional exemplary aspects of the operations performed by the deployment engine 130 are described and illustrated in more detail below with reference to FIGS. 3, 5, and 6.

The tracking engine 140 may be configured to provide functionality for tracking information associated with deployments, such as by recording the tracked information in the one or more databases 118. For example, the tracking engine 140 may track transactions related to a deployment over time. The tracked transactions may include various types of milestones associated with the deployment, such as: a transaction in which the solution module is requested by the customer; a transaction indicating the solution module is ready for deployment (e.g., the blueprint, etc. are complete); a transaction indicating the deployment has been initiated; a transaction indicating the deployment has completed; transactions indicating changes (e.g., an update or upgrade) to the deployment; a transaction associated with decommissioning the deployment (i.e., removing the deployment from the target infrastructure); or other types of transactions. In an aspect, the one or more databases 118 may include a distributed ledger and the transactions may be recorded to the distributed ledger as events corresponding to the transactions are detected. Exemplary aspects of monitoring functionality for detecting events associated with transactions to be recorded to the distributed ledger are described in more detail below.

In some aspects, an identifier (ID), referred to as a request ID, may be created in connection with each request to deploy a solution on infrastructure specified by a customer. For example, when the customer requests deployment of a solution module, the request ID for the deployment requested by that specific customer may be generated. Subsequently, the request ID may be associated with tracked activity corresponding to deployment of the solution module for the customer, such as events that may trigger progression of various phases of the deployment (e.g., generation of the request ID may be a triggering event for creating a solution module or starting deployment for an existing solution module). It is noted that other types of triggering events may also be utilized by the deployment platform 110. For example, detection that a solution module is in a ready for deployment state may trigger initiation of the deployment, a deployment complete event may trigger additional actions, and so on. Tracking and recording of events associated with a deployment provides traceability of what portions of the solution module have been deployed from an end-to-end perspective, allowing the current state or status of a deployment to be determined in real-time on demand. Exemplary aspects of tracking and detecting events are described in more detail below.

During operation, a request for a deployment may be received by the deployment platform 110. For example, the computing device 150 may be associated with a developer or other user (or entity) associated with the deployment platform 110, and a customer associated with the service provider device 160 may request a deployment of a solution. The request may include information about the target computing environment where the solution is to be deployed or the developer may configure the target computing environment information based on information obtained from the customer. Once the requirements information is obtained from the customer, the developer may then utilize computing device 150 to access the deployment platform 110 and engage in a process of creating or selecting a solution module based on the customer requirements information and configuring deployment of the solution module to the target infrastructure specified by the customer.

As described above, a request ID corresponding to the requested solution module may be generated. The request ID may be utilized to track events associated with the requested deployment. The events may include a solution module ready for deployment event, a deployment initiated event, one or more deployment in progress events (e.g., the deployment has started but is not completed), a deployment completed event, a deployment change event (e.g., updates or upgrades to the deployment), a deployment decommissioned event, or other types of events. As the different events are detected, information associated with each event may be logged in a database, such as the above-described distributed ledger. In an aspect, the events logged in the database may be stored as records and may include the request ID corresponding to the deployment to which the request ID pertains. In an additional or alternative aspect, logging of events may utilize other types of information to associate specific deployment events with specific customers, as described in more detail below with reference to FIG. 7. By recording the information associated with each detected event to the distributed ledger, users may be provided with an end-to-end view of the deployment status or state of any deployment initiated via the deployment platform 110.

As described above, once the customer requirements information for a deployment is obtained, the developer may access the one or more databases 118, such as the above-described solution library, to identify existing solutions, solution components, etc. satisfying the customer requirements information. Once the existing solutions, solution components, etc. have been identified, a BOM may be generated. The BOM may include information regarding all of the solutions, solution components, connectors, etc. that are included in the solution module or other information (e.g., price information). It is noted that in some instances a solution module may already exist that meets the customer requirements. In such instances, the developer may simply select that solution module, rather than create a new solution module. The BOMs associated with created solution modules may be stored in the one or more databases 118, as described above.

The developer may utilize functionality of the development engine 120 to configure a solution module for the customer. As described above, the configuring of the solution module may include instantiating a development workspace environment, which may be a physical or virtual workspace environment, and validating the proposed solution module. Configuration of the solution module may also involve creating pipelines (e.g., CI/CD pipelines), capturing information associated with deployment of the solution module, such as dependencies between the different portions of the solution module or infrastructure requirements (e.g., services or processes provided by the target infrastructure that should be present), or other types of information. The dependencies may specify that certain solutions, solution components, connectors, and the like should be deployed in a particular order, which may be determined based on whether a deployed solution, solution component, connector, etc. requires features or functionality provided by another solution, solution component, connector, etc. of the solution module. As such, when a particular portion of the solution module (e.g., a particular solution, solution component, connector, and the like) depends on or requires functionality provided by another portion of the solution module (e.g., another solution, solution component, connector, and the like), the other portion of the solution module should be deployed prior to deploying the particular portion. Additionally, where services, processes, or other functionality provided by the target infrastructure are needed, the information captured regarding the deployment of the solution module in the workspace environment (during development) may specify information that may be used during deployment to verify that those services, processes or functionality are present at the target infrastructure. The information captured regarding the deployment in the workspace environment may be used to generate deployment information. In an aspect, the deployment information may include a blueprint, which may include information that may be used to control the deployment, such as the steps taken to configure deployment of the solution module in the development workspace, etc., as described above. In some aspects, the deployment information may include additional information, such as metadata and deployment configuration data derived from the development workspace.

Once the deployment information is created and the configuration of the solution module is finalized, a deployment ready state or event may be detected for the solution module. Detection of the deployment ready state or event may be used to trigger deployment of the solution module to the target infrastructure. As shown in FIG. 1, the target infrastructure may include one or more service provider device(s) 160, such as web servers, data servers, or other types of computing devices operated by the customer requesting the deployed solution. Additionally or alternatively, the target infrastructure may include cloud infrastructure 104, which may include CSP infrastructure of a third party to the customer requesting the deployed solution (e.g., the customer associated with service provider device(s) 160 may utilize a third party CSP to host the deployed solution in the cloud) or may include cloud infrastructure of the customer.

As described above, deployment of the solution module to the target infrastructure may utilize the deployment engine 130. The deployment engine 130 may include an orchestration service configured to coordinate various aspects of the deployment process. For example, the orchestration process may validate credentials for the deployment (e.g., to verify that the deployment is being initiated by a user that is authorized to start the deployment, etc.), coordinate deployment or installation of the solutions, solution components, connectors, and the like to the target infrastructure while accounting for dependencies, validate any workspace environment requirements (if any) are present, or other operations to coordinate deployment of the solution module to the target infrastructure.

During the deployment, various types of information may be created, captured, and recorded. For example, a state file may be generated and include information regarding a state of the workspace where the deployment is executed (e.g., mappings of resources of the workspace to objects, subnets, virtual private clouds (VPCs), industrial virtual machines (IMCs), etc.). A workspace environment log storing information regarding the workspace environment (e.g., required workspace functions or services present, computing resources allocated to or available to the solution module, etc.) may also be generated. A lockfile may be also created in connection with the deployment. For example, the lockfile may include information associated with a deployed version of the solution module, checksums (e.g., checksums of the code versions deployed to the target infrastructure), or other types of information. The lockfile may be used to prevent changes from being made to the deployment without appropriate permissions (e.g., if an update to the solution module version occurs, the changes will not be deployed without appropriate permissions based on the lockfile).

The deployment engine 130 may also include a solution module manager configured to push the various parts of the solution module (e.g., the selected solutions, solution components, connectors, etc.) to the target infrastructure in cooperation with the orchestration service and other functionality of the deployment engine. In some aspects, the solution module manager may be configured to utilize the blueprint corresponding to the solution module to execute steps for deploying the solutions, solution components, connectors, and the like to the target infrastructure. For example, the solution module manager (or another portion of the deployment engine 130) may be configured to probe the target infrastructure to validate the presence of any functionality or services of the target infrastructure required by the solution module. Once validated, or until such validations are needed, the solution module manager may push the solutions, solution components, connectors, and the like to the target infrastructure in accordance with the dependencies information, configure any parameters required for the deployment to the target infrastructure, or other operations to push the solution module to, and configure the solution module for operation on the target infrastructure. Additional exemplary operations of the deployment engine 130 are described in more detail below with reference to FIG. 5.

During the deployment of the solution module to the target infrastructure, a monitoring service may monitor and track the state or status of the deployment. In some aspects, the monitoring service may be provided via the tracking engine 140. In additional or alternative aspects, the monitoring service may be provided by another component of the deployment platform 110, such as the deployment engine 130. The monitoring service may detect various events as different portions of the solution module deployment are completed. As those events are detected, information corresponding to the detected events may be logged or recorded to the one or more databases 118, such as the above-described distributed ledger. For example, upon detecting an event, the monitoring service may create a record at the distributed ledger that includes information associated with the event, such as to record that the deployment has been initiated, deployment is in-progress (e.g., a particular portion of the solution module has been deployed or a particular verification has occurred during deployment), deployment is complete, or another event associated with a progression of the deployment.

In some aspects, the logged events may also be used as triggering events to initiate generation and transmission of one or more notifications. For example, a deployment initiated may be used as a triggering event to transmit a notification to the developer, the customer, or both that the deployment has been initiated. Similarly, a deployment in progress and/or a deployment complete event may be used as triggering events to control transmission of notifications to the developer, the customer, or both to provide updates on the status of the deployment. Additionally, if any errors are encountered during the deployment, notifications regarding the error(s) may be transmitted to a user (e.g., the developer, the customer, etc.) to inform the developer of a problem that was encountered during the deployment.

Once the deployment is complete, information associated with the deployment may be stored at the one or more databases 118. For example, the one or more databases 118 may include a deployment metadata database and a deployment configuration database. Upon completing a deployment, metadata associated with the deployed solution may be recorded to the deployment metadata database and information regarding a configuration of the deployed solution may be recorded to the deployment configuration database. For example, the metadata associated with a deployed solution may include information associated with folder names, identity and access management roles, and the like. The configuration information may include information regarding the configuration of the deployed solution, such as parameter setting, information associated with computing resources available to the deployed solution, subnet information, and the like. The information stored in the metadata and configuration databases may provide a user with sufficient information to understand how they access the services being deployed.

In addition to recording information associated with the completed deployment in the one or more database 118, as described above, the deployment platform 110 may also be configured to provide functionality for tracking a state of the deployed solution module after deployment is complete. For example, updates or upgrades to the deployed solution (e.g., changes to provide additional functionality, improve performance, etc.) may be created over time by the developer and the customer may request that those changes be pushed to the target infrastructure associated with their previously deployed solution. When such events occur, the changes (e.g., availability of updates or upgrades) may be deployed at the customer's request using the techniques described above and information associated with the changes may be recorded to the one or more databases 118. It is noted that the changes may also include migrations of the deployed solution from one infrastructure to another. For example, if the customer changes their CSP, the deployed solution module may be migrated from the cloud infrastructure of the previous CSP to cloud infrastructure of the new CSP. It is noted that information recorded in such instances may include information associated with a decommissioning of the deployed solution on the original infrastructure and information associated with the deployment on the new infrastructure. In some aspects, rather than recording the change of infrastructure as a decommissioning, the recorded information may indicate a migration.

In some circumstances a customer may eventually terminate the use of a deployed solution (e.g., because the customer no longer needs the functionality provided by the solution, has found an alternative solution, or other reason). When this occurs, the deployment platform 110 may execute a process to remove the deployed solution from the target infrastructure where the solution was deployed and record information associated with the decommissioning of the deployed solution with respect to the customer.

As explained above, each of the events recorded to the distributed ledger in connection with a deployed solution may be associated with a deployment of the solution module for a specific customer. Thus, where two customers both have the same solution module deployed on the same infrastructure (e.g., two instances of a deployed solution (one for each customer) on a single CSP infrastructure), both deployments may be associated with a different request ID corresponding to the respective customer for which each deployed solution was provided. Thus, when changes are implemented by one of the customers, only the deployed solution associated with the deployment corresponding to the customer and the customer's request ID may be impacted (i.e., deployed solutions associated with the request IDs of other customers are not altered or otherwise impacted).

In some aspects, interaction with the above-described distributed ledger may be facilitated, at least in part, using one or more smart contracts. For example, the distributed ledger may include one or more master smart contracts and an instance of one of the master smart contracts (or instances of multiple master smart contracts) may be created when a new deployment is requested by a specific customer. In some aspects, the instance of the smart contract may be created upon generating a request ID. The instance(s) of the smart contract(s) for a particular customer may include functionality for enforcing various aspects a deployment process. To illustrate, the smart contract(s) may be configured to perform validation of access credentials (e.g., an authorization token, etc.) in connection with creating a solution module (i.e., a solution generated based on for a particular customer based on the solution library or a previous solution deployed for another customer), triggering a deployment, enforcing dependencies during a deployment, changing a deployment (e.g., updating, upgrading, or decommissioning an existing deployment), recording information to the distributed ledger (e.g., information captured before, during, or after deployment), or other aspects of a deployment process. It is noted that utilizing smart contracts to control recording of information to the distributed ledger, as well as to control or verify validations performed in connection with a solution module deployment, ensures the integrity of the information recorded to the distributed ledger and creates a record of the deployment lifecycle for each solution module deployed by the deployment platform 110.

It is noted that utilizing a smart contract(s) may improve the security of the deployment platform 110, as well as the predictability and reusability of the solutions developed and deployed by the deployment platform 110. For example, the smart contract(s) may enforce deployment restrictions, such as only enabling a solution to be deployed once for a customer, thereby preventing duplicate or unauthorized deployments, or may verify that infrastructure requirements for a deployment (e.g., services or other features of the target infrastructure) are verified to be present before authorizing further deployment steps. Moreover, using smart contracts to control information recorded to the distributed ledger may ensure that the distributed ledger records information in a consistent manner and that extraneous information is not stored, thereby reducing the potential for needlessly expanding the amount of storage space taken up by the distributed ledger and ensuring that relevant data is captured during each deployment. Additionally, utilizing smart contracts to control deployments may ensure that a particular solution is deployed in a same manner each time (e.g., where the solution is deployed multiple times for multiple customers), which may reduce occurrences of errors during deployment. It is to be understood that the benefits of using smart contracts in connection with the deployment platform 110 have been described above for purposes of illustration, rather than by way of limitation and that additional benefits may also be realized through the use of smart contracts in accordance with the concepts disclosed herein.

Operations and functionality provided by the deployment platform 110 may enable solutions to be deployed to target infrastructure in a self-service manner. For example, once the solution module for the solution requested by the customer is created and ready for deployment, the customer or the developer may initiate deployment of the solution to the target infrastructure by accessing the deployment platform 110. Access to the deployment platform 110 may include presentation of a deployment portal, which may be a graphical user interface providing functionality for controlling, monitoring, and viewing information associated with a solution module and the status of the deployment of that package. An access credential, which may be tied to the request ID generated for the requested solution, may be used to access the deployment platform 110 or the deployment portal. The access credential may be a username and password, an authorization token generated by the deployment platform 110, or other form of credential that may be validated by the deployment platform prior to providing access to the requesting user.

In some aspects, the deployment platform 110 may also utilize additional access credentials during the deployment process. For example, where the target infrastructure is operated by the customer or a third party to the customer, a credential for accessing the infrastructure may be included in the information associated with the solution module, such as in the blueprint or other information. In some aspects, access credentials for third party infrastructure (e.g., cloud infrastructure 104, web servers of a third party web services provider, etc.) or infrastructure of the customer (e.g., service provider device(s) 160) may not be shared with the deployment platform 110—instead, those credentials may be provided during self-service deployment by the customer. For example, upon initiating the deployment, the deployment platform 110 may initiate a connection to the target infrastructure and prompt the user (e.g., the customer) to provide the access credentials for the target infrastructure. Once the access credentials for the target infrastructure are authenticated, the deployment platform 110 may be provided with access to the target infrastructure and begin to perform operations to push the solution to the target infrastructure, as described above. By deploying solutions in this manner the customer may not need to share the access credentials for the target infrastructure, whether that be infrastructure of a third party (e.g., cloud infrastructure of a third party CSP or infrastructure of another type of third party with respect to the customer), while enabling the deployment platform 110 to gain access to that infrastructure for purposes of deploying the solution requested by the customer. In some aspects, any access credentials utilized by deployment platform 110 may be stored in a secure vault, which may include access credentials for accessing the deployment platform 110, the deployment portal, infrastructure of the customer, infrastructure of a third party, or combinations thereof.

Upon successful authentication of the user, which may be the customer or the developer, a graphical user interface (e.g., of the deployment portal) may be presented to the user (e.g., via the user device 150 for deployments initiated by the developer or the user device 162 for deployments initiated by the customer) that enables the user to provide a command to initiate the deployment. The ability to allow a third party (e.g., the customer) to initiate the deployment, rather than the developer, may be facilitated by the above-described blueprint that includes information that may be used to control and automate deployment of the solution to the target infrastructure. As described above, when the deployment is initiated one or more notifications may be transmitted, such as to provide a notification to the developer (e.g., to indicate the customer has initiated the deployment or to notify other users associated with the deployment when the deployment is initiated by the developer). The notifications (e.g., deployment initiated notifications, deployment in progress notifications, deployment complete notifications, etc.) may allow the developer to monitor the status of the deployment for the customer even when the deployment is not initiated by the developer, and may also inform the customer of the status of the deployment (if desired).

It is noted that the deployment of the solution corresponding to the solution module may require further work by the developer. For example, the operations provided by the deployment platform 110 may enable the solution requested by the customer to be created (e.g., from existing solutions, solutions components, connectors, and the like, or combinations thereof) and pushed to the target infrastructure more quickly. However, the deployed solution may require additional configuration once deployed, such as to customize aspects of the deployed solution to the particular use case of the customer. To illustrate, parameters or variables of the deployed solution may need to be configured to interact with databases of the customer (e.g., to enable the solution to correctly retrieve data from or provide data to those databases, etc.). Additionally, where the deployed solution includes customer-facing elements (e.g., elements of graphical user interfaces, e-mails, etc.) that may be provided to users of the customer, the deployed solution may need to be customized to include appropriately branded or styled elements consistent with the requirements of the customer. It is to be understood that the exemplary post-deployment customizations described above have been provided for purposes of illustration, rather than by way of limitation and that other types of post-deployment customizations may be provided.

Regardless of any types of post-deployment customizations that may be performed, a person of ordinary skill in the art would recognize that the functionality of the deployment platform 110 enables solution modules to be created, configured for deployment to a target infrastructure, and deployed to the target infrastructure more rapidly. Moreover, the above-described features of the deployment platform 110 facilitate creation of new solutions in a manner that efficiently enables any existing solutions, solution components, etc. to be reused, and enables deployment of solutions to target infrastructure in a predictable and repeatable manner (e.g., a solution module for a developed solution may be consistently deployed to target infrastructure in the same way, such as using the blueprint). Additionally, the tracking and monitoring capabilities provided by the deployment platform 110 provide end-to-end visibility with respect to deployment of solutions requested by customer, including development of the solution module for a solution, a state of the deployment (e.g., initiated, in-progress, completed), changes to the deployment over time (e.g., upgrades, updates, decommissioning, etc.), or other characteristics of the deployment process or the deployed solution. The end-to-end visibility provided by the monitoring and tracking functionality of the deployment platform 110 may enable events to be detected in connection with the state or status of a deployed solution. As described above, one or more of the events may be used to trigger transmission of a notification to the developer (e.g., a notification transmitted to the computing device 150), the customer (e.g., one of the service provider device(s) 160), or both. The notifications may inform the recipient(s) of the status of the deployment in real-time or near real-time, enabling the recipient(s) (e.g., the developer, the customer, or both) to track the progress of the deployment and receive information about various milestones of the deployment as they occur.

Referring to FIG. 2, a block diagram illustrating exemplary aspects of a development engine in accordance with the present disclosure is shown as a development engine 200. It is noted that the development engine 120 of FIG. 1 may be configured in accordance with the development engine 200 shown in FIG. 2. The development engine 200 may be configured to provide functionality that enables developers to view (e.g., using a GUI provided by the development engine 200) a solution library that includes existing solutions, solution components, connectors, pipelines, and the like available for reuse by the developer. The developer may select one or more existing solutions, solution components, connectors, pipelines, etc. from the solution library to create a new solution that meets requirements specified by a customer, and create a solution module including information for deploying the newly created solution on infrastructure specified by the customer. To facilitate this functionality, the development engine 200 may include a microservices module 210 and a development portal 220, and may record information associated with solution modules to one or more databases 230. It is noted that the one or more databases 230 may include one or more of the databases 118 of FIG. 1 and/or the one or more databases 360 of FIG. 3.

The microservices module 210 may be configured to provide functionality for monitoring aspects of solution module development and deployment and may facilitate communication between the development engine 200 and/or other components of a deployment platform, such as a deployment engine (e.g., the deployment engine 130 of FIG. 1 and/or the deployment engine 300 of FIG. 3) and a tracking engine (e.g., the tracking engine 140 of FIG. 1). For example, functionality of the microservices module 210 may be configured to provide a monitoring services that may be used to monitor the state of deployments (e.g., deployment ready, initiated, in-progress, completed, updated or upgraded, decommissioned, etc.), as described above. Additionally, the microservices module 210 may provide functionality for coordinating recording of information about the state of deployments to a database, such as the distributed ledger described above with reference to FIG. 1, and functionality for providing notifications to users (e.g., developers, customers, or other users) in connection with deployments. The microservices module 210 may also provide functionality for a topology service that receives target infrastructure detail (e.g., information about cloud services or other aspects of the target infrastructure) from the deployment engine and records the information to an appropriate database(s) (e.g., the one or more databases 118 of FIG. 1, such as the distributed ledger, the deployment metadata database, a deployment configuration database, or another database(s)).

In an aspect, the microservices module 210 may utilize application programming interfaces (APIs) to control operations associated with solution module development or deployment of a solution module to target infrastructure. For example, the APIs may provide interfaces that expose the functionality provided by the microservices module 210 to a deployment engine (e.g., the deployment engine 130 of FIG. 1), a tracking engine (e.g., the tracking engine 140 of FIG. 1), target infrastructure (e.g., interfaces to cloud infrastructure of a CSP, such as cloud infrastructure 104 of FIG. 1), or other computing resources that may be leveraged to facilitate creation, configuration, and execution of deployments in accordance with the present disclosure. For example, an API of the microservices module 210 may be utilized to initiate a deployment via interaction with the deployment engine in response to commands provided by a user or in response to detection of a deployment ready state. Initiation of the deployment may include passing information or parameters to the deployment engine, such as information identifying the blueprint for the initiated deployment or other types of information that may be used for the deployment to the target infrastructure (e.g., access credentials, a request ID corresponding to the initiated deployment, infrastructure requirements, and the like). The API(s) may also be configured to expose other functionality of the microservices module 210 to other components or systems, such as the above-described topology service, notification services, ledger or database read/write services, and the like.

In some aspects, validation of the infrastructure requirements, such as the presence of existing services on the cloud infrastructure, may be validated using functionality provided by a smart contract, as explained above. In such examples, the API(s) of the microservices module 210 may be configured to interact with the smart contract to pass information to the smart contract, such as information from the solution module specifying the infrastructure requirements, and may additionally or alternatively pass information to the smart contract from the deployment engine, such as information regarding the presence of existing services or other infrastructure requirements captured during a deployment. If the infrastructure requirements are determined by the smart contract to be satisfied, the smart contract may issue a response indicating that the deployment may proceed and trigger recording of the infrastructure requirements being validated to the distributed ledger. If the infrastructure requirements are not met, the smart contract may issue a response indicating any infrastructure requirements that are not met and those requirements may then be further processed by the deployment engine (e.g., the deployment engine may attempt to obtain additional information from the infrastructure regarding the identified requirements).

The development portal 220 may be configured to provide development operations functionality and pipeline building functionality. As described above, the development operations functionality may enable the developer to create a solution module for the customer that incorporates existing solutions, solution components, and the like selected from the solution library. For example, where a customer solution requires a crawler (e.g., a tool or service for traversing through one or more websites to obtain or extract information), the developer may select an existing crawler for inclusion in the customer solution, rather than building the crawler from scratch, as performed using previous development techniques. Additionally, the solution module developed for the customer may utilize an existing solution selected from the library for analyzing and evaluating the data generated by the crawler. In some aspects, a connector facilitating communication between the selected crawler and the existing solution for analyzing data extracted by the crawler may also be selected (e.g., to enable the crawler to provide data to the existing solution for analysis and evaluation). After selecting these components from the solution library, the developer may utilize the pipeline building functionality to define a pipeline for controlling how the selected components interact with each other to provide services and functionality that meets the customer requirements, such as to define a pipeline for triggering activation of the crawler, delivery of data obtained by the crawler to the analysis solution via the connector, and the like.

The development portal 220 may also enable the developer to instantiate a workspace environment, which may be used to build a blueprint or pipeline (e.g., a CI/CD pipeline, etc.) that includes steps for deploying the solution module to the target infrastructure, as described above with reference to FIG. 1. The functionality of the development portal 220 may also include functionality for generating a BOM that includes information identifying the solutions or solution components (e.g., crawlers, connectors, pipelines, etc.) selected from the solution library for inclusion in the solution module being developed. In some aspects, the BOM may also include information associated with deployment environment requirements (e.g., information regarding the type of environment or infrastructure the solution module can be deployed on), or other types of information (e.g., price information). Alternatively, such information may be stored as part of the blueprint. Information generated via the functionality provided by the development module 220 may be stored in one or more databases 230, such as the one or more databases 118 described above with reference to FIG. 1.

To illustrate the above-described functionality of the development engine 200, and with reference to FIG. 4, a block diagram illustrating exemplary aspects of a development process in accordance with the present disclosure is shown. It is noted that the workflow shown and described with reference to FIG. 3 may be performed by the development engine 200 of FIG. 2 and/or the development engine 120 of FIG. 1. Furthermore, it is to be understood that the exemplary aspects of a development engine described with reference to FIG. 3 are provided for purposes of illustration, rather than by way of limitation and that other aspects of the development and the functionality it provides are described elsewhere herein, such as with reference to FIGS. 1 and 2.

As shown in FIG. 4, a developer may access the development portal 220 to configure a request for a new deployment of a solution module. The developer may utilize the functionality provided by the development portal to configure a new solution module request 402, which may be stored at the database(s) 230. As explained above, the solution module may be created using one or more existing solutions selected from a solution library, thereby eliminating the need to develop a solution for the customer from scratch. The developer may utilize development operations and pipeline building functionality 410 of the development portal 220 to create the solution module.

During generation of the solution module, the developer may instantiate a workspace environment 420, which may be a physical or virtual workspace corresponding to the target infrastructure on which the solution module is to be deployed, as described above. The developer may utilize the workspace environment 420 and the development operations and pipeline building functionality 410 to generate deployment data 404 (e.g., data that may be used to configure subsequent deployments of the solution module to target infrastructure of customers, such as the blueprint or CI/CD pipelines described above). In some aspects, functionality of the microservices module 210 of FIG. 2 may be utilized during the development of the solution module. For example, the monitoring service of the microservices module 210 may include functionality for capturing infrastructure requirements or other types of information that may be used to create the deployment data 404 or other types of data. As described in more detail below, once the deployment data 404 is stored at the database(s) 230, the solution module may be in the ready for deployment state.

Referring to FIG. 3, a block diagram illustrating exemplary aspects of a deployment engine in accordance with the present disclosure is shown as a development engine 300. It is noted that the deployment engine 130 of FIG. 1 may be configured in accordance with the deployment engine 300 shown in FIG. 3. The deployment engine 300 may be configured to provide functionality that enables developers to deploy a solution module generated in accordance with the concepts described herein, such as a solution developed using the development engine 120 of FIG. 1, the development engine 200 of FIG. 2, and the development process of FIG. 4. To facilitate deployment of a solution module, the deployment engine 300 may include a an orchestration module 310, a validation module 320, a workspace management module 330, a solution module manager 340, and a monitoring module 350, and may utilize information stored in or record information regarding a deployment to one or more databases 360, each of which is described in more detail below. It is noted that the one or more databases 360 may include one or more of the databases 118 of FIG. 1 and/or the one or more databases 230 of FIG. 2.

As described above with reference to FIG. 1, the orchestration module 310 may be configured to control operations for deploying solution modules on target infrastructure (e.g., infrastructure specified by customers). The target infrastructure may include physical servers or other computing device of the customer or a third party (e.g., infrastructure of a CSP). The orchestration module 310 may be configured to obtain information regarding the solutions and components of the solution module, dependencies between the solutions and components, supported environments, topology information associated with the target deployment environment, or other types of information associated with requirements for deploying the solution module. In some aspects, the orchestration service may obtain this information from the one or more databases 118, such as using the BOM associated with the solution module or other types of information associated with development of the solution module. During deployment of the solution module, the orchestration service may coordinate various operations that facilitate deployment or installation of the solution module on the target infrastructure or environment. Exemplary operations that may be coordinated by the orchestration service may include: verification of credentials in connection with the deployment, validation of workspace environment requirements (e.g., verify the presence of extended services of the target infrastructure utilized by the solution module, etc.), generation of one or more workspace management files that may be used to control and monitor the deployment, execution of a solution module blueprint for deploying the solution module, recording of data associated with the deployment at the one or more databases 118, or other types of operations. Exemplary aspects of operations to deploy a solution module on target infrastructure are described in more detail below with reference to FIGS. 3, 5, and 6.

The orchestration module 310 may be configured to obtain information regarding the solution module, and use the obtained information to generate information that may be used to control the portions deployment. For example, the orchestration service may be configured to obtain metadata associated with deployment of the solution module from a deployment metadata database (e.g., one of the one or more databases 360) and information associated with configuration of the solution module deployment from a deployment configuration database (e.g., another one of the one or more databases 360). The orchestration module 310 may be configured to merge the metadata and the configuration information to produce a deployment variable file. The deployment variable file may include information for configuring aspects of the deployment, such as dependencies, supported environments, topology information associated with the target deployment environment, infrastructure requirements, or other types of information associated with requirements for deploying the solution module.

The validation module 320 may be configured to perform validation operations during the deployment. For example, the validation module 320 may validate access credential information (e.g., an authorization token, etc.) in connection with the deployment of the solution. The workspace management module 330 may be configured to initialize a workspace environment, which may include a workspace for developmental operations, as described above, or a deployment workspace environment (e.g., obtaining access to resources of the target infrastructure onto which the solution module will be deployed). The workspace management module 330 may be configured to maintain various files associated with the deployment, such as the above-described state file, lock file, and environment log.

The solution module manager 340 may be configured to execute the deployment. For example, the solution module manager 340 may be configured to extract information from the blueprint created for the solution module during development, and use the extracted information to perform the deployment of the solution module onto the workspace initialized on the target infrastructure. During the deployment, the solution module manager 340 may execute scripts configured to implement the deployment. In some aspects, the scripts may be configured to perform actions based on information captured from the development workspace, such as executing the deployment in a particular order based on dependencies corresponding to the solution module, validation of infrastructure requirements, or other types of operations. Once the deployment is completed, the solution module manager 340 may determine metadata and configuration information for the solution module, as deployed on the target infrastructure, and may record that information to the one or more databases 360, such as the above-described deployment metadata and deployment configuration databases, respectively.

It is noted that the functionality provided by the validation module 320, the workspace management module 330, and the solution module manager 340 may be initiated as part of a pipeline (e.g., a CI/CD pipeline) configured via the development engine (e.g., the development engine 120 of FIG. 1 or the development engine 200 of FIG. 2). For example, the deployment variable file may include variables or parameters (e.g., subnet information, the blueprint, dependencies, infrastructure requirements, etc.) that may be passed to the relevant modules 320-340 to initialize those modules with appropriate parameters for deploying the solution module to the target infrastructure.

The monitoring module 350 may be configured to monitor a state of the deployment and may execute various actions based on the state of the deployment. For example, the monitoring module 350 may be configured to detect one or more events, such as deployment initiated, deployment in-progress, deployment complete, or another event, and in response to detection of these events may initiate an action to record the status of the deployment in the one or more databases 360, such as to record the status of the deployment in the distributed ledger, as described above. Additionally, the monitoring module 350 may be configured to trigger transmission of alerts or notifications to users (e.g., the developer, the customer, etc.) based on some of detected the events. To illustrate, in addition to logging the deployment initiated status in the distributed ledger upon detecting a deployment initiated event, the monitoring module 350 may also trigger transmission of a notification to the user(s) to indicate that the deployment has begun in response to detection of the deployment initiated event. It is noted that the specific events and notifications described above have been provided for purposes of illustration, rather than by way of limitation and that the monitoring module 350 may be configured to detect additional events and trigger transmission additional notifications as desired depending on the configuration of the deployment engine 300 (or the deployment platform 110 of FIG. 1).

Additionally, it is noted that in some aspects the monitoring module 350 may communicate information to another portion of the deployment platform, such as the microservices module 210 of FIG. 2, which may involve leveraging functionality exposed to the deployment engine 300 via one or more APIs, such as the APIs described above with reference to FIG. 2. For example, an API may be configured to expose functionality of the microservices module that enables information to be recorded to the distributed ledger to the deployment engine 300, and the monitoring module 350 may be configured to pass information to the API to cause that information to be recorded to the distributed ledger. Additionally, a notification service provided by the microservices module may be exposed to the deployment engine 300 via an API and the deployment engine may trigger generation and transmission of a notification to the user by passing information to the API.

Figure 5:
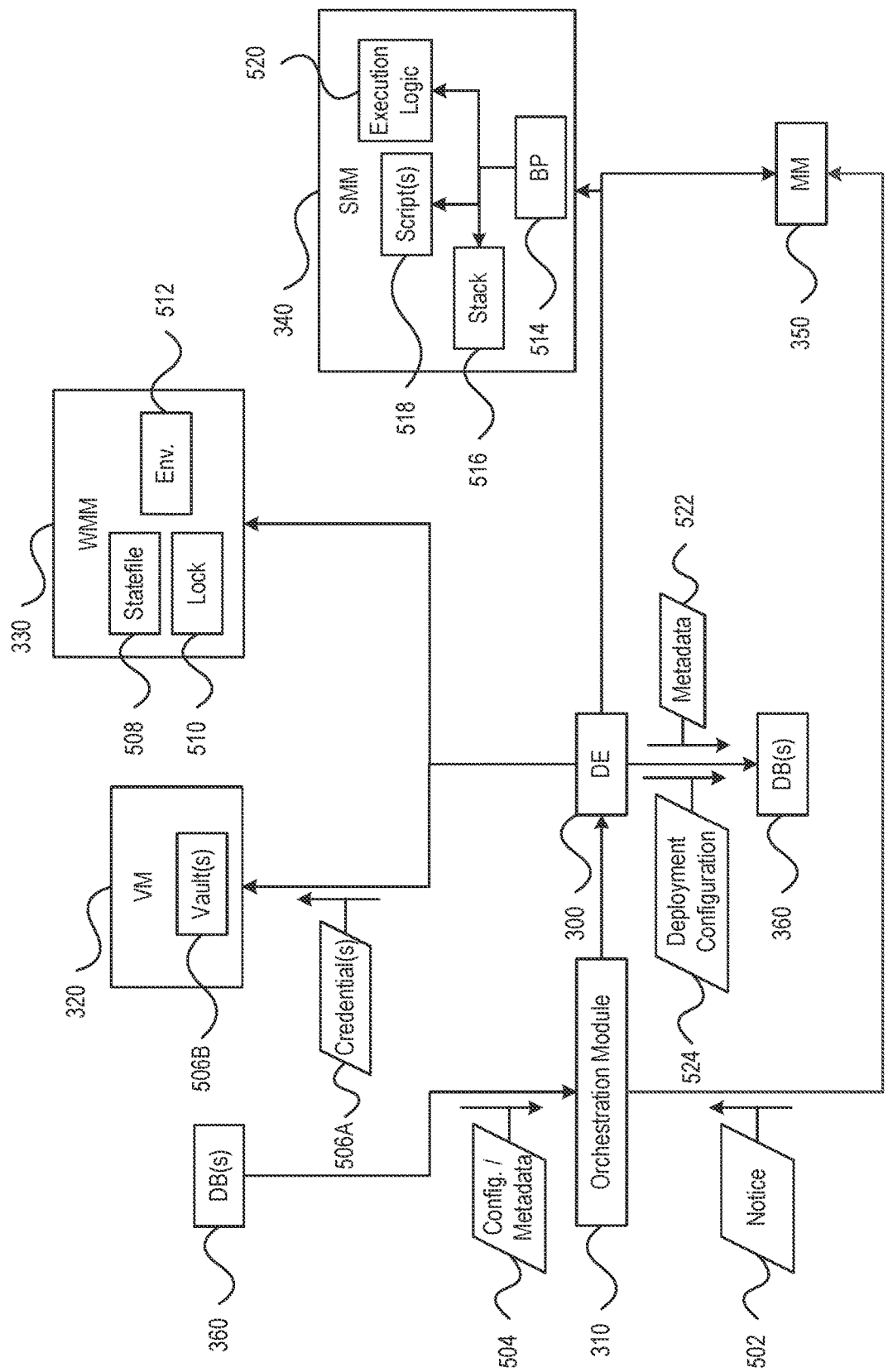
FIG. 5 is a block diagram illustrating exemplary aspects of a deployment process in accordance with the present disclosure.

Referring to FIG. 5, a block diagram illustrating exemplary aspects of a deployment process in accordance with the present disclosure is shown. It is noted that the exemplary deployment process shown in FIG. 5 may be performed using the deployment engine 130 of FIG. 1 or the deployment engine 300 of FIG. 3. As shown in FIG. 5, information indicating a solution module is read for deployment may be stored at the one or more databases 360. The monitoring module 350 may detect that the solution module is in the ready for deployment state (e.g., by periodically polling the one or more databases 360) and upon detecting the ready for deployment state, may transmit information to the orchestration module 310 indicating the ready state of the solution module. In an aspect, the ready for deployment state may be triggered in response to validating a deployment request from a user (e.g., the developer or the customer). For example, a request to initiate a deployment may include a payload identifying the solution module requested for deployment and credential information (e.g., an authorization token or other form of access credential(s)) that may be used to verify the deployment is authorized. The credential information may be passed to the validation module 320 as credential(s) 506A and validated against information stored in a vault 506B (e.g., a vault of access credential information). If the authorization token is valid, the validation module 320 may transmit a response authorizing the deployment, which may be recorded to the database(s) 360, such as the distributed ledger described above. When recording the response from the validation module 320, the database(s) may be updated to reflect that the solution module associated with the request is ready for deployment.

In response to receiving a notice 502 from the monitoring module 350 that the solution module is in the ready for deployment state, the orchestration module 310 may extract configuration and metadata 504 from the one or more databases 360, as described above with reference to FIG. 3. The orchestration module 310 may then utilize the configuration and metadata 504 to configure a variable file that may be utilized to configure operations of the deployment engine 300, such as operations of the workspace management module 330, and the solution module manager 340. For example, the orchestration module 310 may pass relevant portions of the variable file to the workspace management module 330 and the solution module manager 340. The information passed to the workspace management module 330 may include information associated with configuring a workspace where the solution module is to be deployed. For example, the information passed to the workspace management module 330 may include information that may be used to generate a statefile 508, a lockfile 510, and an environment log 512. As described above, the statefile 508, the lockfile 510, and the environment log 512 may store information associated with the workspace and the solution module deployed to the workspace by the deployment engine 300. The information passed to the solution module manager 340 may include a blueprint 514, which may include information for configuring the deployment of the solution module to the workspace initialized by the workspace management module 330. For example, the blueprint may include a sequence of steps for deploying the solution module to the workspace, where the sequences of steps may be created or recorded during development (e.g., via the development engine 120 of FIG. 1 or the development engine 200 of FIG. 2 based on the development workspace). In an aspect, the blueprint 514 may be used to configure a deployment stack 516, scripts 518, and execution logic 520 used to deploy the solution module to the target infrastructure. For example, the deployment stack 516 may be configured with information regarding target infrastructure requirements, such as services or functionality expected to be present in the target infrastructure, or other information that may be used to verify the configuration of the target infrastructure conforms to what is expected. The solution module manager 340 may be configured to validate the workspace initialized by the workspace management module based on the deployment stack 516. The scripts 518 may comprise executable code for pushing the solution module to the target infrastructure and may be configured based on the particular solutions, solution components, connects, and the like included in the solution module being deployed. The execution logic 520 may be configured with dependency information that specifies an order in which the solution module should be deployed (e.g., which solutions, solution components, connectors, etc. should be deployed first, when validations of the workspace should be determined during deployment (which may involve information of the deployment stack 516), and the like.

Once the deployment stack 516, the scripts 518, and the execution logic 520 are configured based on the blueprint 514, the solution management module 340 may begin the deployment of the solution module to the target infrastructure. As the various pieces of the deployment are performed, the monitoring module 350 may track the progress of the deployment and may record a current status of the deployment to the one or more databases 360 (e.g., to the distributed ledger), as described above. In particular, as each solution, solution component, connector, and the like that are included in the solution module is deployed, the monitoring module 350 may record the deployment status to the database(s) 360. Exemplary aspects of the types of information that may be recorded to the database(s) 360 (e.g., the distributed ledger) as the deployment progresses are described in more detail below with reference to FIG. 7.

Once the deployment is complete, the deployment engine 300 (or a component of the deployment engine 300) may record information to the database(s) 360 associated with the deployed solution module. For example, the post-deployment information may include metadata 522 representative of a configuration of the solution module as deployed on the target infrastructure and deployment configuration information 524 representative of the deployment of the solution module on the target infrastructure. In an aspect, the metadata and configuration information for the deployed solution module may be stored in a metadata database and a deployment configuration database, as described above. It is noted that as changes or modifications to solution modules are made, such as creating new versions of the solution modules (e.g., updates, upgrades, etc.), those changes or modifications may be pushed to target infrastructure upon which the solution modules are deployed using the techniques described above in accordance with requests for such changes or modifications by the customer.

In some aspects, when updates or upgrades become available for deployed solution modules, one or more notifications may be transmitted to customers (e.g., customer devices 162 of FIG. 1) to inform the customers of the availability of new updates or upgrades to their deployed solution modules. The customers may contact the developer to arrange or authorize deployment of the updates or upgrades based on the notification(s), or for other reasons, such as to decommission a deployed solution module. It is noted that changes to a deployed solution module may also include changes unrelated to the solution module itself (i.e., changes unrelated to updates or upgrades to the solutions, solution components, connectors, etc. included in the solution module). To illustrate, a solution module may be deployed to target infrastructure with an initial set of roles and the customer may subsequently need to change the set of roles. The changes to the set of roles may be pushed to the target infrastructure by the deployment engine, and information associated with the new set of roles may be recorded to the distributed ledger and/or another location, such as the above-described metadata database. As explained above, when the deployed solution is decommissioned, information regarding the decommissioning of the deployed solution(s) may be recorded to the database(s) 360, such as the distributed ledger.

As shown above with reference to FIGS. 3 and 5, the deployment engine 300 may enable solution modules to be deployed in an automated fashion with little or no human intervention (e.g., other than to submit a request for the deployment). Additionally, through use of the various control mechanisms for initializing the workspace environment at the target infrastructure, validating deployment requirements, and controlling deployment in a manner that takes into account dependencies, the operations of the deployment engine 300 may enable solution modules to be deployed to various types of target infrastructure in a consistent and predictable manner. Moreover, the deployment of any particular solution module may be performed in the same manner every time it is deployed, thereby enabling the solution module to be rapidly deployed to target infrastructure many different times for many different customers, and each deployment may be tracked and monitored throughout the lifecycle, thereby providing the developer with a way to obtain a comprehensive of any deployed solution modules, the status of those deployments, or other types of information. By utilizing the deployment engine 300, solution modules may be deployed rapidly to target infrastructure, thereby enabling the focus of the developer to be placed on post-deployment customization of the deployed solution module, rather than spending significant amounts of time developing the functionality the solution module provides, which is a current cause of delay using existing development tools. Additionally, the capabilities of the deployment engine 300 enable the full operability of the deployed solution module (including post-deployment customization) to be completed in a much more rapid fashion than would otherwise be possible using presently available deployment tools.

Figure 6:
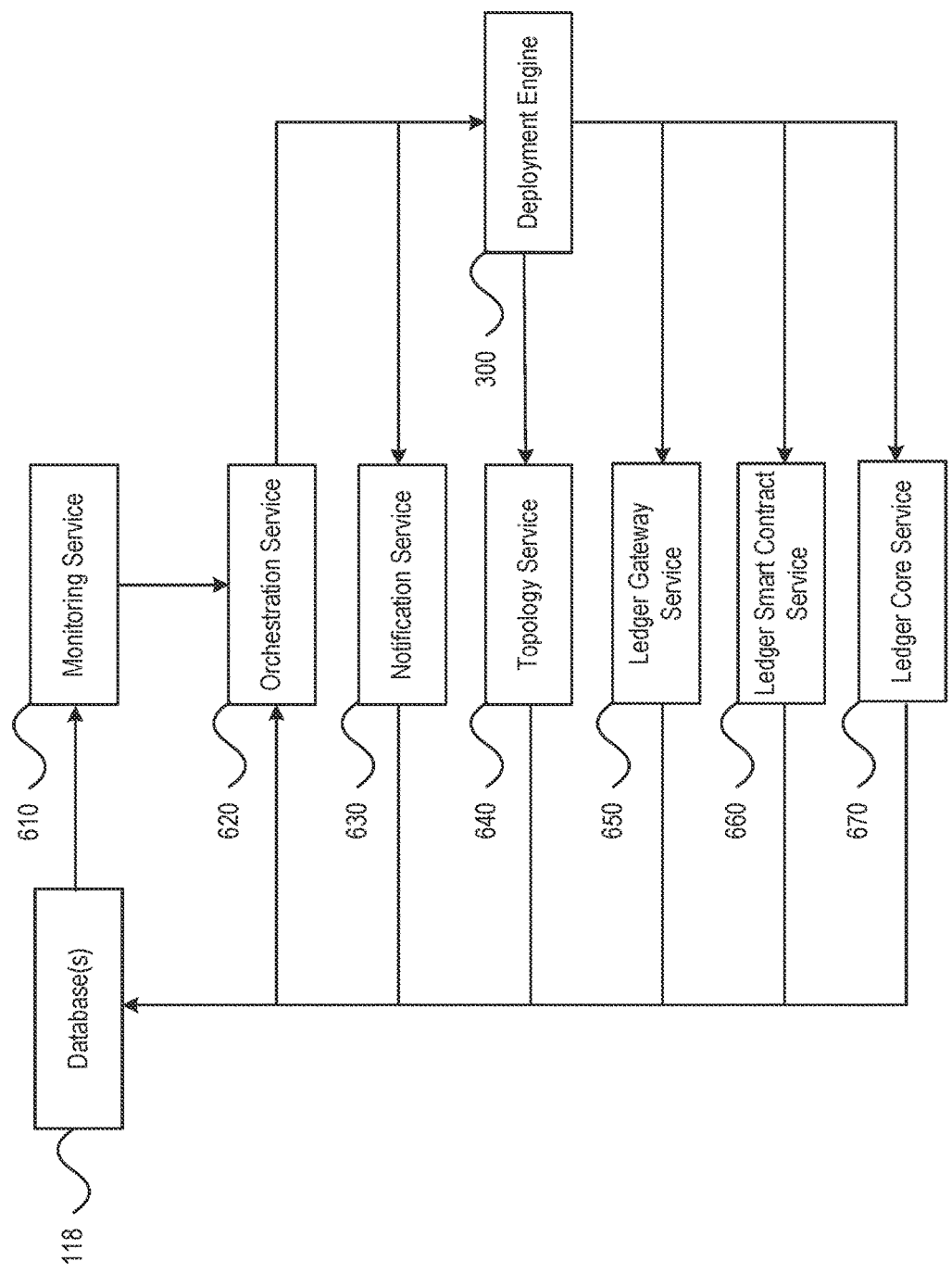
FIG. 6 is a block diagram illustrating exemplary services of a deployment platform in accordance with the present disclosure.

Referring to FIG. 6, a block diagram illustrating exemplary services of a deployment platform in accordance with the present disclosure is shown. In an aspect, the exemplary services described with reference to FIG. 6 may be provided by the development engines 120, 200 of FIGS. 1 and 2, and/or the deployment engine 130, 300 of FIGS. 1 and 3. As shown in FIG. 6, the services of a deployment platform according to aspects of the present disclosure may include a monitoring service 610, an orchestration service 620, a notification service 630, a topology service 640, a ledger gateway service 650, a ledger smart contract service 660, and a ledger core service 670. These services may be used to coordinate various aspects of a deployment and facilitate intercommunication between different aspects of the deployment platform (e.g., the deployment platform 110 of FIG. 1).

The monitoring service 610 may be configured to monitor various aspects of both development of solution modules and deployment of solution modules. For example, the monitoring service 610 may monitor for events associated with development and deployment of solution modules, such as deployment ready events, deployment initiated events, deployment in-progress events, deployment completed events, or other events, as described herein. In an aspect, the monitoring service 610 may monitor the one or more databases 118, which may include the database(s) 230 of FIG. 2 and/or the database(s) 360 of FIG. 3, to detect the events. For example, the various deployment events may be detected as changes to the database(s) 118 are recorded, such as when new information is recorded to the distributed ledger regarding a deployment. As described above, the monitoring service 610 may communicate with the orchestration service 620 (e.g., the orchestration service 310 of FIG. 3) when certain events are detected, such as a deployment ready state.

As described with reference to FIGS. 3 and 5, the monitoring service 610 may be configured to pass parameters or other information upon detection of events, such as passing an authorization token (or other form of access credential(s)) and information corresponding to the solution module to be deployed, to the orchestration service 620 upon detecting the deployment ready state. Upon receiving the parameters from the monitoring module, the orchestration service 620 may retrieve information from the database(s) 118, such as the above-described metadata and deployment configuration data, and may use the retrieved information to generate information for configuring a deployment. The information generated by the orchestration service 620 may be used to configure deployment of the solution module by the deployment engine 300 (or the deployment engine 130 of FIG. 1), as described above with reference to FIG. 5.

The notification service 630 may be configured to generate alerts or notifications based on information received from the deployment engine 300. For example, when the deployment is initiated, the notification service 630 may receive information indicating the deployment has started and may transmit a notification to one or more users (e.g., the developer, the customer, etc.) to indicate the deployment has begun. The notification service 630 may also provide additional notifications associated with a deployment of a solution, such as notifications providing updates on the status of the deployment of the solution module, notifications indicating the deployment is complete, notifications that updates or upgrades are available, notifications that the deployed solution has been decommissioned, or other types of notifications depending on the particular configuration of the deployment platform. Additionally, if an unexpected error is encountered during deployment, the notification service 630 may be configured to provide an alert to the developer to indicate that the error occurred. In some aspects, the notifications may be delivered to a GUI, such as a GUI presented on a developer computing device (e.g., the computing device 150 of FIG. 1) to allow the developer to view the status of the deployment as it progresses. In some aspects, information regarding notifications transmitted by the notification service 630 may recorded to the database(s) 118.

The topology service 640 may be configured to capture information regarding the topology of deployments on the target infrastructure onto which the solution module is deployed. As described above, the topology information may be captured during both development and deployment. In an aspect, the topology information captured during development may be stored in a topology database that includes information associated with the target infrastructure and which may be subsequently used during development of future solution modules. In such an aspect, the topology information associated with the actual deployment may be recorded to a different database, such as the above-described deployment configuration database. However, it is noted that the topology information may be stored in a single database if desired, such as the above-described deployment configuration database.

The ledger gateway service 650, the ledger smart contract service 660, and the ledger core service(s) 670 may be configured to cooperate in connection with recording of information to, and enabling interaction with the distributed ledger. For example, the ledger gateway service 650 may be configured to interface the deployment module 300 with the distributed ledger, such as to enable the deployment engine 300 to record information to the distributed ledger. The ledger smart contract service 660 may provide functionality that provides access to smart contracts deployed on the distributed ledger in connection with a deployment. As explained above, instances of master smart contracts may be created for each deployment to control access to the distributed ledger in connection with each deployment of a solution module. The ledger core service(s) 670 may provide functionality for maintaining and supporting the distributed ledger. Using the ledger gateway service 650, the ledger smart contract service 660, and the ledger core service(s) 670, the deployment engine 300 may be enabled to record information about the status of the deployment or other types of information to the distributed ledger, such as the various types of information described below with reference to FIG. 7 or other types of information relevant to the deployment of a solution module.

As shown above, deployment platforms in accordance with embodiments of the present disclosure may provide various services to facilitate control of solution module deployment and for recording information associated with the deployment to a database, such as the above-described distributed ledger. It is noted that the services shown and described with reference to FIG. 6 are provided for purposes of illustration, rather than by way of limitation and that deployment platforms in accordance with the present disclosure may provide other services or mechanisms for achieving the above-described features for deploying solution modules to target infrastructure in a manner that provides end-to-end visibility into the status and state of deployments and notifications or alerts in connection with the deployments. Moreover, it is to be understood that while FIG. 6 shows specific independent services, one or more service modules may be utilized to provide functionality described with respect to the services shown in FIG. 6. It should also be understood that any of the services utilized by deployment platforms in accordance with embodiments of the present disclosure may utilize APIs or other mechanisms to facilitate interaction with various components of the deployment platform, such as the databases, development engines, deployment engines, tracking engines, and the like.

Figure 7:
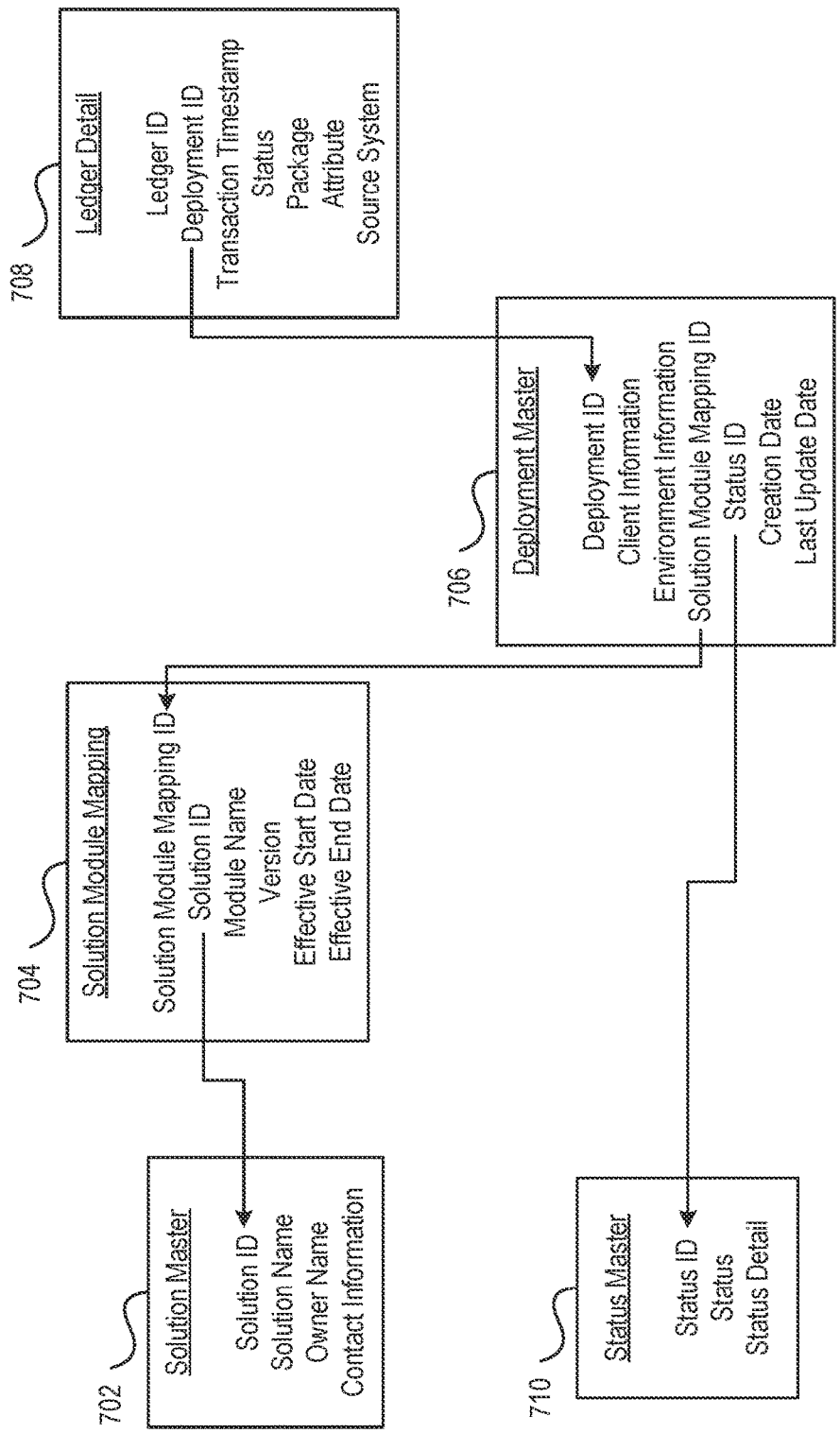
FIG. 7 is a block diagram illustrating exemplary aspects of a ledger in accordance with the present disclosure.

Referring to FIG. 7, a block diagram illustrating exemplary aspects of a ledger in accordance with the present disclosure is shown. In an aspect, the distributed ledger configuration shown in FIG. 7 may represent the configuration of the distributed ledger described above with reference to FIGS. 1-6. However, it is noted that the configuration of the exemplary distributed ledger shown in FIG. 7 is provided for purposes of illustration, rather than by way of limitation and that other configurations of a distributed ledger may be utilized in accordance with the concepts disclosed herein.

As shown in FIG. 7, the distributed ledger may include a series of tables 702, 704, 706, 708, 710. The table 702 may include records associated with existing solutions (e.g., one of the solutions, solution components, connectors, etc. stored in the solution library). Each record may include a plurality of data fields associated with the corresponding existing solution. In the example of FIG. 7, the plurality of data fields for each of the records of table 702 include a solution ID (e.g., a unique identifier corresponding to the existing solution, solution component, connector, etc.), a solution name, owner information (e.g., information identifying a developer that created the solution), and contact information (e.g., an e-mail address, a telephone number, etc.) for the owner.

Table 704 may include records associated with solution modules developed for deployment in accordance with the concepts described herein. For example, each record of table 704 may include data fields associated with a solution module mapping ID (e.g., an identifier assigned to a developed solution module), one or more solution IDs (e.g., information identifying the existing solution(s), solution component(s), etc. used to create the solution module), a module name (e.g., a name assigned to the solution module), version information (e.g., information specifying a particular version of the solution module, where different versions of the solution module may be associated with different records of table 704), an effective start date (e.g., a date upon or after which the particular version of the solution module is available for deployment), and an effective end date (e.g., a date upon or after which the particular version of the solution module is no longer available for deployment).

Table 706 may include records associated with deployments of solution modules in accordance with the concepts disclosed herein. For example, each record may include a deployment ID (e.g., an ID assigned to a deployment requested for a specific customer), client information (e.g., information identifying the customer), environment information (e.g., information identifying the target infrastructure for the deployment), a solution module mapping ID (e.g., information identifying the particular solution module to be deployed), a status ID (e.g., information associated with a status record corresponding to the deployment, described in more detail below), a deployment create date (e.g., a date on which the deployment request was created), and a last update date (e.g., a date on which the deployment was last modified, such as due to an update, upgrade, etc.).

Table 708 may include records associated with the lifecycle of each deployment. For example, each of the records may include a ledger ID (e.g., an ID corresponding to record of the ledger), a deployment ID (e.g., information identifying which deployment of the solution module the record pertains to), a transaction timestamp (e.g., a time at which a transaction in connection with the deployment occurred), a status (e.g., information indicating whether the deployment is ready for deployment, initiated, in-progress, completed, updated, decommissioned, etc.), package information, attribute information, and source system information (e.g., information identifying a source system initiating the transaction).

Table 710 may include records storing information pertaining to a status of the solution module over the life-cycle of each deployment. For example, each record may be associated with a status ID (e.g., an identifier associated with each record of table 710), status state information (e.g., information indicating a status of the deployment, such as ready for deployment, initiated, in-progress, completed, etc.), and status detail (e.g., information regarding specifics of the status, such as a phase of deployment currently in progress or information indicating infrastructure requirements have been validated, etc.).

It is noted that a single deployment may be associated with multiple records in one or more of the tables 702-710. For example, a single deployment may have multiple entries or records in tables 708 and 710, where the multiple records may track information associated with deployment of the solution module over its lifecycle and provide a comprehensive view of the lifecycle from development, to deployment, and through decommissioning the deployed solution module. Additionally, table 706 may include multiple records for a single solution module, such as to record information associated with deployment of different versions of the solution module for a single customer or deployment of a same version of the solution module for different customers. Similarly, table 704 may include multiple records for a single solution module, each record pertaining to a different version of the solution module.

As shown in FIG. 7, the records of in one of the various tables 702-710 may be linked to corresponding records in other ones of the tables 702-710 using a primary key. For example, records in table 704 may be linked to records in table 702 via the solution ID field, records in the table 706 may be linked to records in tables 704, 710 via the solution module mapping ID field and the status ID field, respectively, and records in table 708 may be linked to records in table 706 via the deployment ID field. It is noted that while each table includes a data field linking the table to at least one other table, information may be collected for presentation to a user in a comprehensive manner (e.g., in a way that presents information from multiple tables collectively) via the data fields linking the tables to each other. For example, a user may access a GUI, such as the above-described development portal, and request to view information regarding a particular deployment. The request may specify the deployment ID, which may be used to obtain corresponding records from the tables 708 and 710. Additionally, status information may be obtained from table 710 using the status IDs of records of the table 706 associated with the deployment ID, and information about the solution module may be obtained from table 704 using the solution module mapping ID of records of the table 706 associated with the deployment ID. Similarly, information about the individual solutions, solution components, etc. included in the solution module may be obtained from table 702 using the solution IDs included in the records of the table 704, which may be identified based on the solution module mapping ID information included in the records of table 706 that are associated with the deployment ID. It is noted that any combination of the above-described information could be extracted from the distributed ledger and presented to the user via the GUI.

Figure 8:
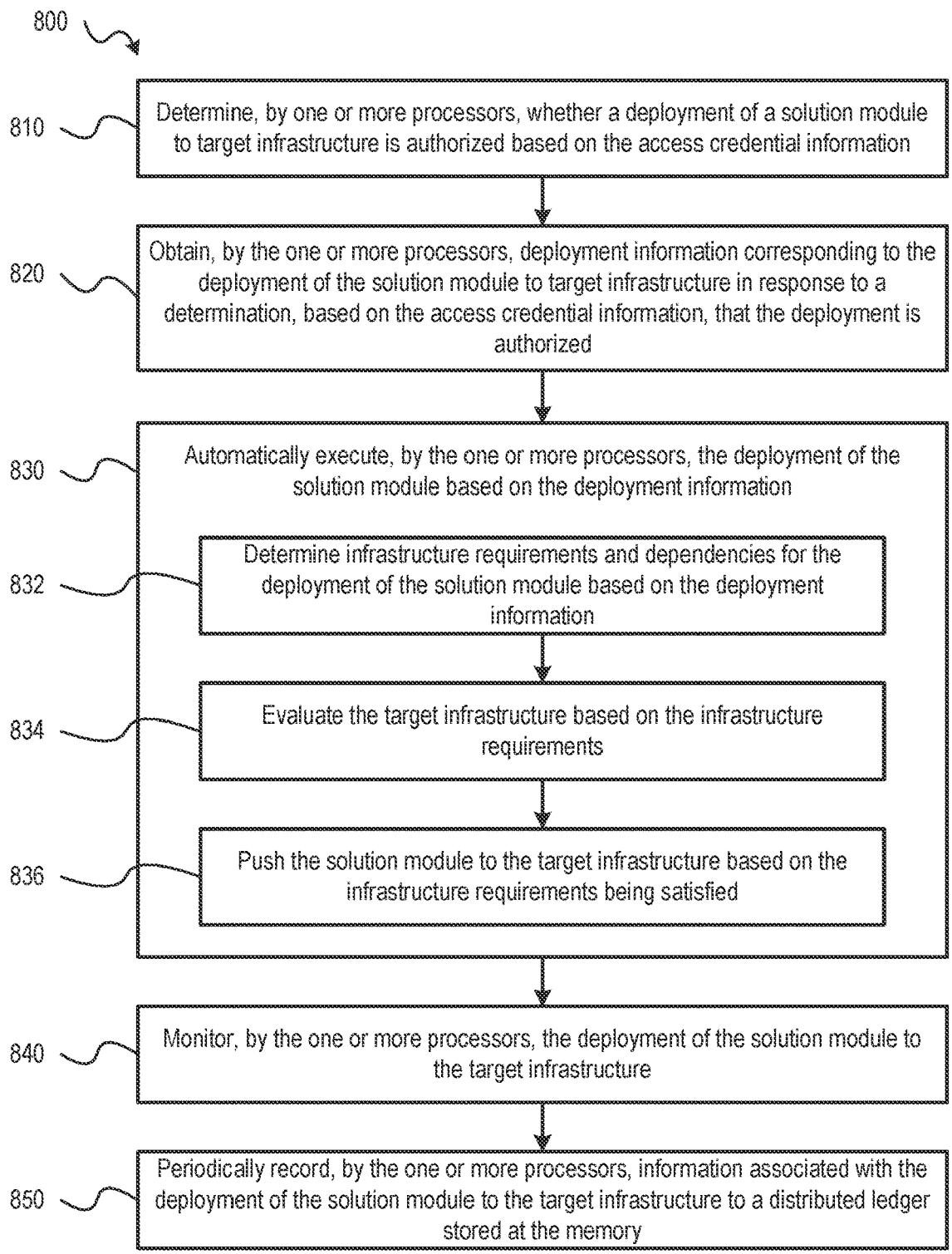
FIG. 8 is a flow diagram of an exemplary method for deploying a solution module in accordance with aspects of the present disclosure.

Referring to FIG. 8, a flow diagram of an exemplary method for deploying network-based solutions in accordance with aspects of the present disclosure is shown as a method 800. In an aspect, steps of the method 800 may be stored as instructions (e.g., the instructions 116 of FIG. 1) that, when executed by one or more processors, cause the one or more processors to perform operations for deploying solution modules to target infrastructure in accordance with the present disclosure. It is noted that the method 800 may be performed by a deployment platform, such as the deployment platform 110 of FIG. 1 or the cloud deployment platform 102 of FIG. 1. Additionally, the method 800 may be performed by the deployment engine 130 of FIG. 1 or the deployment engine 300 of FIGS. 3, 5, and 6.

At step 810, the method 800 includes determining, by one or more processors, whether a deployment of a solution module to target infrastructure is authorized based on the access credential information. In an aspect, the access credential information may include an authorization token or other form of access credential and may be validated based on information stored in a vault (e.g., the vault 506 of FIG. 5) of the deployment platform. In some aspects, the determination at step 810 may be performed in response to detecting that the solution module is in a deployment ready state. As described above, the solution module may be configured to provide functionality that satisfies requirements specified by a customer and may be built using existing solutions, solution components, connectors, and the like using a development engine (e.g., the development engine 120 of FIG. 1).

At step 820, the method 800 includes obtaining, by the one or more processors, deployment information corresponding to the deployment of the solution module to target infrastructure in response to a determination, based on the access credential information, that the deployment is authorized. As described above, the deployment information may include a blueprint, dependency information, infrastructure requirements information, or other types of information (e.g., metadata and deployment configuration data generated based on a deployment workspace environment) that may be used to execute deployment of the solution module to the target infrastructure.

At step 830, the method 800 includes automatically executing, by the one or more processors, the deployment of the solution module based on the deployment information. In some aspects, executing the deployment of the solution module may include: determining infrastructure requirements and dependencies for the deployment of the solution module based on the deployment information, as step 832; evaluating the target infrastructure based on the infrastructure requirements, at 834; and pushing the solution module to the target infrastructure based on the infrastructure requirements being satisfied, at step 836. As described above, evaluating the target infrastructure based on the infrastructure requirements may include determining whether services, functionality, or other aspects of the target infrastructure are present at the time of deployment of the solution module. It is noted that different portions of the solution module may be pushed to the target infrastructure in a sequence, which may be determined, at least in part, based on the dependency information associated with the solutions, solution components, connects, etc. of the solution module.

At step 840, the method 800 includes monitoring, by the one or more processors, the deployment of the solution module to the target infrastructure. As described above, the monitoring may be configured to detect various events associated with a status of the deployment, such as a deployment initiated event, one or more deployment in-progress events, a deployment complete event, or other types of events (e.g., validation successful/failed events). At step 850, the method 800 includes periodically recording, by the one or more processors, information associated with the deployment of the solution module to the target infrastructure to a distributed ledger. As explained above, recording events to the distributed ledger in connection with deploying the solution module may enable a user (e.g., the customer or a developer) to view a comprehensive or end-to-end history of the deployed solution module.

In some aspects, the method 800 may provide additional functionality, such as notification functionality. For example, one or more notifications may be generated and transmitted to users as various events are detected during deployment. Additionally, notifications may be generated and transmitted to users when changes to a solution module occur, such as when updates or upgrades are available. As explained above, when a customer desires to update or upgrade a deployed solution module, the method 800 may be utilized to deploy the update or upgrade to the target infrastructure. However, it is noted that when updates or upgrades occur, only those portions of the already deployed solution that are required to be modified may be changed during deployment of the upgrade or update. Additionally, it is noted that any modifications to the deployed solution module may be recorded to the distributed ledger, as described in more detail above. It should be understood that the method 800 may also include other functionality described herein in connection with deploying solution modules in accordance with the present disclosure, and is not limited to the exemplary functionality explicitly described with reference to FIG. 8.

As shown above, the method 800 may enable solution modules to be deployed in an automated fashion with little or no human intervention (e.g., other than to submit a request or provide an appropriate access credential for initiating the deployment). Additionally, through use of the various control mechanisms for initializing the workspace environment at the target infrastructure, validating deployment requirements, and controlling deployment in a manner that takes into account dependencies, the operations of the method 800 may enable solution modules to be deployed to various types of target infrastructure in a consistent and predictable manner. Moreover, the method 800 enables deployment of any particular solution module to be performed in the same manner every time it is deployed, thereby enabling the solution module to be deployed to target infrastructure many different times for many different customers, and each deployment may be tracked and monitored throughout the lifecycle, thereby providing the developer with a way to obtain a comprehensive of any deployed solution modules, the status of those deployments, or other types of information. By utilizing the method 800, solution modules may be deployed rapidly to target infrastructure, thereby enabling the focus of the developer to be placed on post-deployment customization of the deployed solution module, rather than spending significant amounts of time developing the functionality the solution module provides, which is a current cause of delay using existing development tools. Furthermore, the deployment capabilities provided by systems implementing the method 800, such as the deployment platform 110 of FIG. 1, may enable the full operability of the deployed solution module (including post-deployment customizations and optimization) to be completed in a much more rapid fashion than would otherwise be possible using presently available deployment tools.

Figure 9:
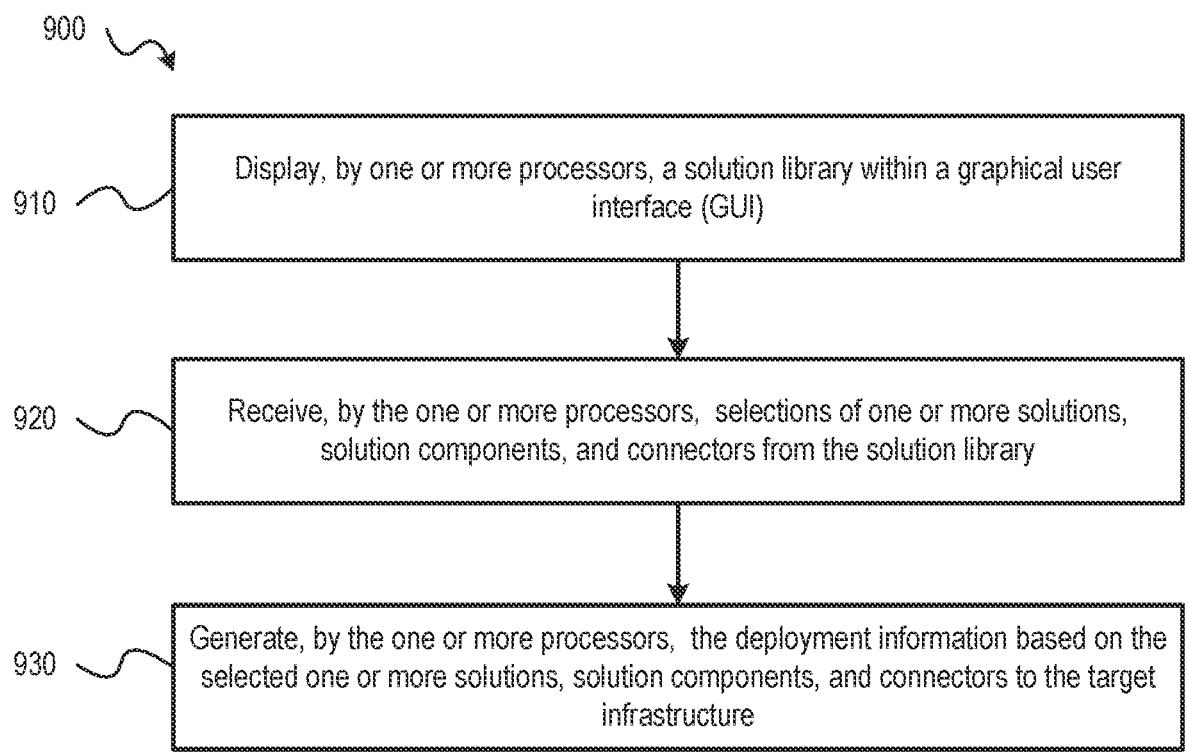
FIG. 9 is a flow diagram of an exemplary method for developing a solution module in accordance with aspects of the present disclosure.

Referring to FIG. 9, a flow diagram of an exemplary method for deploying network-based solutions in accordance with aspects of the present disclosure is shown as a method 900. In an aspect, steps of the method 900 may be stored as instructions (e.g., the instructions 116 of FIG. 1) that, when executed by one or more processors, cause the one or more processors to perform operations for deploying solution modules to target infrastructure in accordance with the present disclosure. It is noted that the method 900 may be performed by a deployment platform, such as the deployment platform 110 of FIG. 1 or the cloud deployment platform 102 of FIG. 1. Additionally, the method 900 may be performed by the development engine 120 of FIG. 1 or the development engine 200 of FIGS. 2 and 4.

At step 910, the method 900 includes displaying, by one or more processors, a solution library within a graphical user interface (GUI). In an aspect, the GUI may be provided by the development portal 210 of FIG. 2. As described above, the GUI may provide interactive tools and functionality for building the solution module based on pre-existing solutions, solution components, and connectors. For example, at step 920, the method 900 includes receiving, by the one or more processors, selections of one or more solutions, solution components, and connectors from the solution library. In an aspect, the selections may be based on requirements information provided by a customer, and deployment of the solution module may be configured to deploy functionality of the selected one or more solutions, solution components, and connectors to target infrastructure of the customer, such as to enhance the capabilities or services the customer can provide to a user base (e.g., users of the customer's services or systems).

At step 930, the method 900 includes generating, by the one or more processors, deployment information based on the selected one or more solutions, solution components, and connectors and the target infrastructure. As explained above, the deployment information may include a blueprint that includes steps for executing deployment of the solution module to the target infrastructure. The deployment information may also include dependency information, infrastructure requirements, or other types of information that may be used to deploy the solution module.

As explained above, the method 900 may enable solution modules to be developed more rapidly through efficient techniques that promote reusability, predictability, and reliability. For example, by leveraging existing solutions, solution components, connectors, etc. to build the solution module, time spent developing the functionality requested by a customer may be reduced. Additionally, development of redundant solutions and functionality may be eliminated, regardless of whether solution developers operate in silos or not. Moreover, utilizing a development workspace to create a blueprint and other deployment information for the solution module prior to deploying the solution module to the target infrastructure may improve the likelihood that the deployment is successful. It should be understood that the method 900 may also include other functionality described herein in connection with developing solution modules in accordance with the present disclosure, and is not limited to the exemplary functionality explicitly described with reference to FIG. 9.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Additionally, it is noted that while FIGS. 1-9 illustrate various aspects of the present disclosure using various logical blocks, devices, modules, and the like, such presentation has been provided for purposes of illustrating the various functionality and features provided by deployment platforms configured in accordance with the present disclosure, rather than by way of limitation. Therefore, it should be understood that any of the blocks, modules, devices, or other aspects of the drawings and description may be combined into a single block, module, or device (e.g., the development and deployment engines may be implemented as a single engine or functional module, etc.) or may be expanded into additional blocks, modules, and devices (e.g., the deployment platform may be deployed as multiple servers, each providing functionality of one of the development engine, the deployment engine, the tracking engine, or other implementations and configurations). Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A deployment platform for deploying solution modules to target infrastructure, the deployment platform comprising:

a memory;

one or more processors;

a solution library stored at the memory, the solution library comprising code corresponding to pre-existing solutions, solution components, and connectors;

a development portal executable by the one or more processors and configured to:

provide a graphical user interface (GUI) providing interactive tools for building a solution module based on at least the pre-existing solutions, solution components, and connectors;

display the solution library within the GUI;

receive selections of one or more solutions, solution components, and connectors from the solution library, wherein deployment of the solution module is configured to deploy functionality of the selected one or more solutions, solution components, and connectors to the target infrastructure; and generate deployment information based on the selected one or more solutions, solution components, and connectors; and a deployment engine executable by the one or more processors and configured to:

determine whether the deployment of the solution module to the target infrastructure is authorized based on access credential information, wherein the solution module is configured to provide functionality that satisfies requirements specified by a customer;

obtain the deployment information corresponding to the deployment of the solution module to the target infrastructure in response to a determination, based on the access credential information, the deployment is authorized;

execute the deployment of the solution module to the target infrastructure based on the deployment information, wherein executing the deployment of the solution module comprises:
  determining infrastructure requirements and dependencies for the deployment of the solution module based on the deployment information;
  evaluating the target infrastructure based on the infrastructure requirements; and
  pushing the solution module to the target infrastructure based on the infrastructure requirements being satisfied, wherein different portions of the solution module are pushed to the target infrastructure in a sequence based on the dependencies;
monitor the deployment of the solution module to the target infrastructure; and
periodically record information associated with the deployment of the solution module to the target infrastructure to a distributed ledger stored at the memory.

2. The deployment platform of claim 1, wherein the solution module is generated without writing new code.

3. The deployment platform of claim 1, wherein generation of the deployment information comprises:
  instantiating a development workspace;
  deploying the selected one or more solutions, solution components, and connectors to the development workspace; and
  recording information associated with deployment of the selected one or more solutions, solution components, and connectors to the development workspace, wherein the recorded information comprises a blueprint for deployment of the solution module, and wherein the deployment of the solution module to the target infrastructure is based on the blueprint.

4. The deployment platform of claim 3, wherein the deployment information comprises deployment metadata and deployment configuration data generated based on deployment of the selected one or more solutions, solution components, and connectors to the development workspace, and wherein the one or more processors are configured to:
  record, at one or more databases stored at the memory, final deployment metadata and final deployment configuration data corresponding to the deployment of the solution module to the target infrastructure subsequent to deployment of the solution module to the target infrastructure.

5. The deployment platform of claim 3, wherein the recorded information comprises information associated with the dependencies, and wherein the one or more processors are configured to:
  determine the sequence used to push the different portions of the solution module to the target infrastructure based on the dependencies.

6. The deployment platform of claim 1, wherein the one or more processors are configured to transmit one or more notifications to a user based on the monitoring, the one or more notifications comprising information associated with a status of the deployment of the solution module to the target infrastructure.

7. The deployment platform of claim 1, further comprising one or more smart contracts stored at the memory, wherein the one or more smart contracts comprise functionality for controlling, at least in part, deployment of the solution module to the target infrastructure.

8. The deployment platform of claim 1, further comprising a monitoring service executable by the one or more processors, wherein the monitoring service is configured to:
  detect the solution module is in a deployment ready state based on information stored in the distributed ledger or a database stored at the memory; and
  trigger deployment of the solution module to the target infrastructure based on detection that the solution module is in the deployment ready state, wherein triggering the deployment of the solution module to the target infrastructure comprises:
    extracting parameters from the deployment information; and
    transmitting the parameters to an orchestration service of the deployment engine, wherein the orchestration service is configured to orchestrate pushing of the solution module to the target infrastructure by the deployment engine.

9. The deployment platform of claim 8, wherein the deployment engine comprises:
  a monitoring module configured to provide the monitoring service;
  an orchestration module configured to provide the orchestration service;
  a validation module configured to validate access credentials included in the parameters;
  a workspace management module configured to manage a workspace used to deploy the solution module to the target infrastructure; and
  a solution module manager configured to push the different portions of the solution module to the target infrastructure.

10. A method for deploying solution modules to target infrastructure, the method comprising:
  providing, by one or more processors, a graphical user interface (GUI) that includes interactive tools for building a solution module based on at least pre-existing solutions, solution components, and connectors of a solution library;
  display, by the one or more processors, the solution library within the GUI;
  receiving, via the interactive tools of the GUI, selections of one or more solutions, solution components, and connectors from the solution library, wherein deployment of the solution module is configured to deploy functionality of the selected one or more solutions, solution components, and connectors to the target infrastructure; and
  generating, by the one or more processors, the solution module and deployment information based on the selected one or more solutions, solution components, and connectors to the target infrastructure, wherein the solution module is generated without writing new code;
  determining, by the one or more processors, whether the deployment of the solution module to the target infrastructure is authorized based on access credential information, wherein the solution module is configured to provide functionality that satisfies requirements specified by a customer;
  obtaining, by the one or more processors, the deployment information corresponding to the deployment of the solution module to the target infrastructure in response to a determination, based on the access credential information, the deployment is authorized;

automatically executing, by the one or more processors, the deployment of the solution module to the target infrastructure based on the deployment information, wherein executing the deployment of the solution module comprises:
- determining infrastructure requirements and dependencies for the deployment of the solution module based on the deployment information;
- evaluating the target infrastructure based on the infrastructure requirements, wherein the evaluating for the deployment of the solution module based on the target infrastructure; and
- pushing the solution module to the target infrastructure based on the infrastructure requirements being satisfied, wherein different portions of the solution module are pushed to the target infrastructure in a sequence based on the dependencies;

monitoring, by the one or more processors, the deployment of the solution module to the target infrastructure; and periodically recording, by the one or more processors, information associated with the deployment of the solution module to the target infrastructure to a distributed ledger stored at a memory.

11. The method of claim 10, wherein generation of the solution module and the deployment information comprises:
- instantiating a development workspace;
- deploying the selected one or more solutions, solution components, and connectors to the development workspace; and
- recording information associated with deployment of the selected one or more solutions, solution components, and connectors of the solution module to the development workspace, wherein the recorded information comprises a blueprint for deployment of the solution module, and wherein the deployment information used to deploy the solution module to the target infrastructure includes the blueprint.

12. The method of claim 11, wherein the deployment information comprises deployment metadata and deployment configuration data generated based on deployment of the selected one or more solutions, solution components, and connectors to the development workspace, the method further comprising:
- recording, at one or more databases stored at the memory, final deployment metadata and final deployment configuration data corresponding to the deployment of the solution module to the target infrastructure subsequent to deployment of the solution module to the target infrastructure.

13. The method of claim 10, further comprising transmitting one or more notifications to a user based on the monitoring, the one or more notifications comprising information associated with a status of the deployment of the solution module to the target infrastructure.

14. The method of claim 10, further comprising:
- detecting the solution module is in a deployment ready state based on information stored in the distributed ledger or a database stored by a deployment platform; and
- triggering deployment of the solution module to the target infrastructure based on detection that the solution module is in the deployment ready state, wherein triggering the deployment of the solution module to the target infrastructure comprises:
  - extracting parameters from the deployment information; and
  - initializing an orchestration service based on the parameters, wherein the orchestration service is configured to orchestrate pushing of the solution module to the target infrastructure.

15. A non-transitory computer-readable medium storing instructions that, when executed by one or more processors, cause the one or more processors to perform operations for deploying solution modules to target infrastructure, the operations comprising:
- providing a graphical user interface (GUI) that includes interactive tools for building a solution module based on at least pre-existing solutions, solution components, and connectors of a solution library;
- display the solution library within the GUI;
- receiving, via the interactive tools of the GUI, selections of one or more solutions, solution components, and connectors from the solution library, wherein deployment of the solution module is configured to deploy functionality of the selected one or more solutions, solution components, and connectors to the target infrastructure; and
- generating the solution module and deployment information based on the selected one or more solutions, solution components, and connectors, wherein the solution module is generated without writing new code, and wherein generation of the solution module and the deployment information comprises:
  - instantiating a development workspace;
  - deploying the selected one or more solutions, solution components, and connectors to the development workspace; and
  - recording information associated with deployment of the selected one or more solutions, solution components, and connectors of the solution module to the development workspace, wherein the recorded information comprises a blueprint for deployment of the solution module, and wherein the deployment information used to deploy the solution module to the target infrastructure includes the blueprint;
- determining whether the deployment of the solution module to the target infrastructure is authorized based on access credential information, wherein the solution module is configured to provide functionality that satisfies requirements specified by a customer;
- obtaining the deployment information corresponding to the deployment of the solution module to the target infrastructure in response to a determination, based on the access credential information, the deployment is authorized;
- automatically executing the deployment of the solution module to the target infrastructure based on the deployment information, wherein executing the deployment of the solution module comprises:
  - determining infrastructure requirements and dependencies for the deployment of the solution module based on the deployment information;
  - evaluating the target infrastructure based on the infrastructure requirements, wherein the evaluating for the deployment of the solution module based on the target infrastructure; and
  - pushing the solution module to the target infrastructure based on the infrastructure requirements being satisfied, wherein different portions of the solution module are pushed to the target infrastructure in a sequence based on the dependencies;
- monitoring the deployment of the solution module to the target infrastructure; and periodically recording information associated with the deployment of the solution module to the target infrastructure to a distributed ledger stored at a memory.

16. The non-transitory computer-readable medium of claim 15, the operations further comprising:
deploying additional instances of the solution module to the target infrastructure, wherein the deployment information is reused during deployment of the additional instances of the solution module, and wherein the deployment of the solution module is associated with a first customer and the additional instances of the solution module that are deployed to the target infrastructure are associated with additional customers that are different from the first customer.

17. The non-transitory computer-readable medium of claim 15, the operations further comprising:
modifying the deployment of the solution module to the target infrastructure, wherein the modifying comprises at least one of:
deploying an upgrade for the solution module to the target infrastructure;
deploying an update for the solution module to the target infrastructure; or
decommissioning the solution module deployed to the target infrastructure; and recording, to the distributed ledger, information associated with the modifying.

* * * * *